US012634766B2

(12) United States Patent
Yi et al.

(10) Patent No.: US 12,634,766 B2
(45) Date of Patent: May 19, 2026

(54) TRANSMISSION AND RECEPTION METHOD AND DEVICE ON BASIS OF MAXIMUM DATA RATE IN COMMUNICATION SYSTEM

(71) Applicant: Samsung Electronics Co., Ltd., Suwon-si (KR)

(72) Inventors: Junyung Yi, Suwon-si (KR); Jeongho Yeo, Suwon-si (KR); Youngbum Kim, Suwon-si (KR); Suha Yoon, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 18/282,908

(22) PCT Filed: Apr. 4, 2022

(86) PCT No.: PCT/KR2022/004768
§ 371 (c)(1),
(2) Date: Sep. 19, 2023

(87) PCT Pub. No.: WO2022/211599
PCT Pub. Date: Oct. 6, 2022

(65) Prior Publication Data
US 2024/0187934 A1 Jun. 6, 2024

(30) Foreign Application Priority Data
Apr. 2, 2021 (KR) ........................ 10-2021-0043632

(51) Int. Cl.
*H04W 28/22* (2009.01)
*H04W 72/0446* (2023.01)
*H04W 72/1263* (2023.01)

(52) U.S. Cl.
CPC ....... *H04W 28/22* (2013.01); *H04W 72/0446* (2013.01); *H04W 72/1263* (2013.01)

(58) Field of Classification Search
CPC ............. H04W 28/22; H04W 72/0446; H04W 72/1263; H04W 72/51; H04W 8/24; H04L 5/0064
See application file for complete search history.

(56) References Cited

U.S. PATENT DOCUMENTS

2022/0070898 A1 3/2022 Yeo et al.

FOREIGN PATENT DOCUMENTS

EP 3 793 248 A1 3/2021
EP 4 120 598 A2 1/2023
(Continued)

OTHER PUBLICATIONS

VIVO, Discussion on PUSCH TB processing over multiple slots, 3GPP Draft, R1-2100458, 3GPP TSG RAN WG1 #104-e, Jan. 18, 2021, XP051970380.
(Continued)

*Primary Examiner* — Mandish K Randhawa
(74) *Attorney, Agent, or Firm* — Jefferson IP Law, LLP

(57) ABSTRACT

The present disclosure relates to a 5G or 6G communication system for supporting higher data transmission rates. According to an embodiment of the present disclosure, a method performed by a terminal in a communication system is provided. The method comprises the steps of: confirming a maximum data rate supported by the terminal; confirming an instant data rate on the basis of the number of slots corresponding to one transport block (TB); confirming whether or not the maximum data rate satisfies the condition of being equal to or greater than the instant data rate; and transmitting or receiving data on the basis of whether or not the condition is satisfied.

4 Claims, 23 Drawing Sheets

(56)         References Cited

FOREIGN PATENT DOCUMENTS

KR       10-2020-0099044  A       8/2020
KR       10-2021-0123993  A      10/2021
WO       WO-2019216725  A1  *  11/2019    ........ H04W 72/0446
WO           2021/034255  A1      2/2021

OTHER PUBLICATIONS

Extended European Search Report dated Jun. 26, 2024, issued in
European Patent Application No. 22781718.6.
Qualcomm, 'Remaining issues on PUSCH enhancements for URLLC',
R1-2008609, 3GPP TSG RAN WG1 Meeting #103-e, Nov. 1, 2020.
Nokia et al., 'Transport block processing for PUSCH coverage
enhancements', R1-2101711, 3GPP TSG RAN WG1 Meeting #104-
e, Jan. 18, 2021.
NEC, 'Discussion on TB processing over multi-slot PUSCH',
R1-2100943, 3GPP TSG RAN WG1 Meeting #104-e, Jan. 19, 2021.

* cited by examiner (a) Block diagram of channel coding using no outer code (b) Block diagram of channel coding using outer code

Add CRC to TB, and then divide same into multiple CBs 8-24

Figure 8:
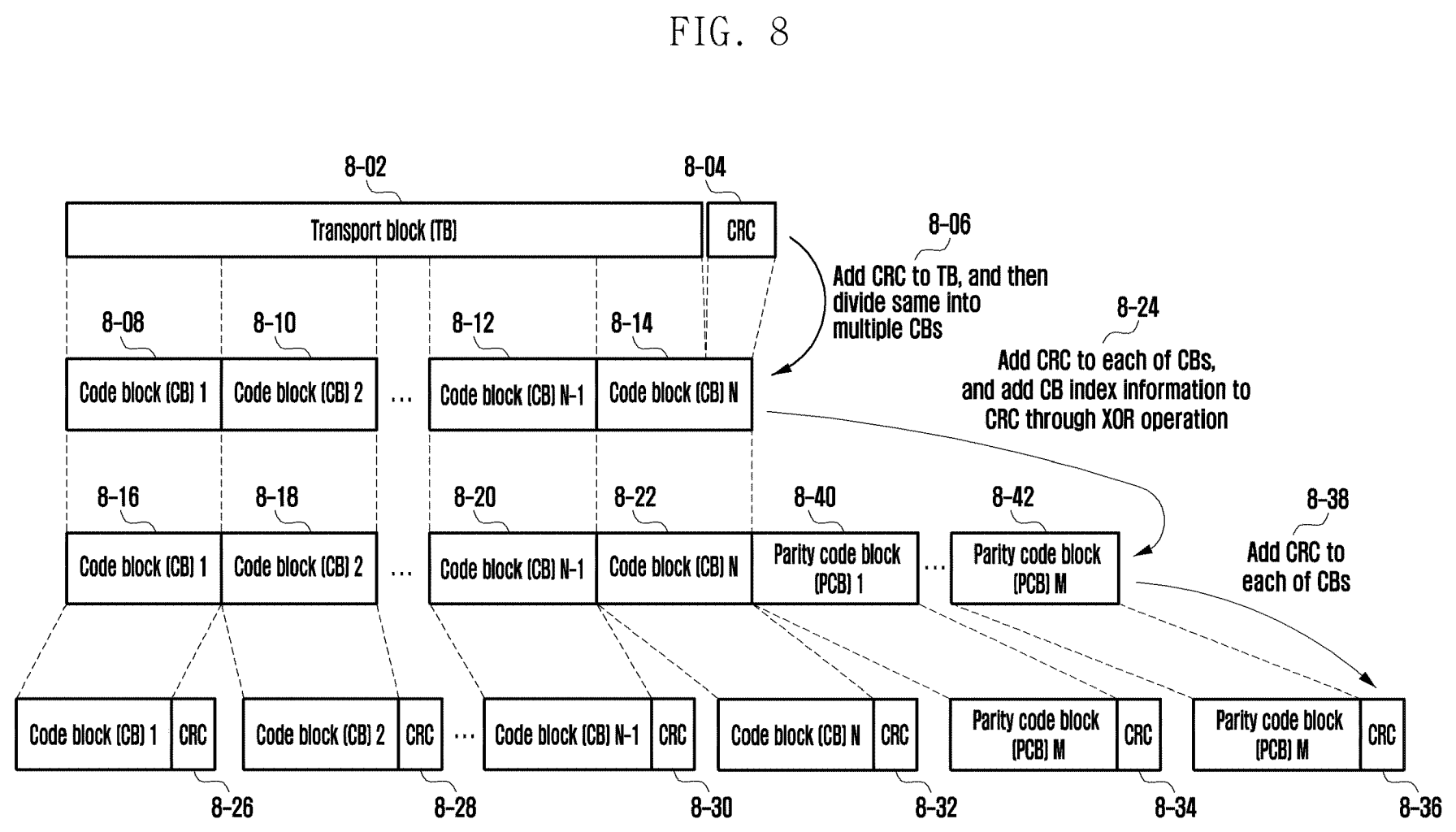

Add CRC to each of CBs, and add CB index information to CRC through XOR operation 8-38

Add CRC to each of CBs 8-04 CRC 8-02 Transport block (TB)

8-08 Code block (CB) 1
8-10 Code block (CB) 2
8-12 Code block (CB) N-1
8-14 Code block (CB) N 8-16 Code block (CB) 1
8-18 Code block (CB) 2
8-20 Code block (CB) N-1
8-22 Code block (CB) N 8-40 Parity code block (PCB) 1
8-42 Parity code block (PCB) M 8-26 Code block (CB) 1 | CRC
8-28 Code block (CB) 2 | CRC
8-30 Code block (CB) N-1 | CRC
8-32 Code block (CB) N | CRC 8-34 Parity code block (PCB) M | CRC
8-36 Parity code block (PCB) M | CRC FIG. 9
Transport block processing over multi-slot PUSCH(TBoMS):
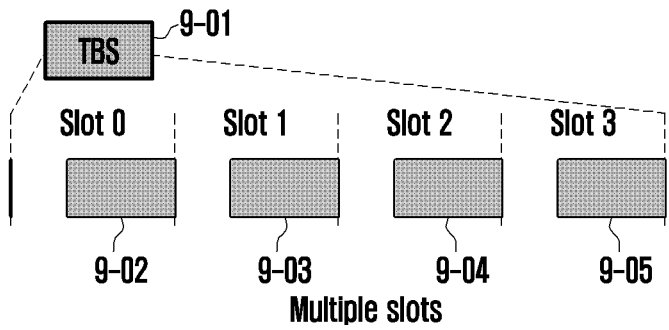
PUSCH repetition type A like TDRA for TBoMS (S=5, L=9, k=4) (9-06):
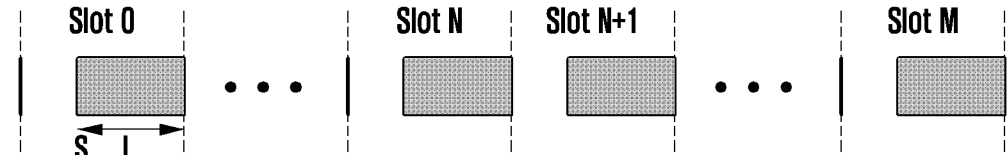
PUSCH repetition type B like TDRA with long symbol L for TBoMS (9-07):
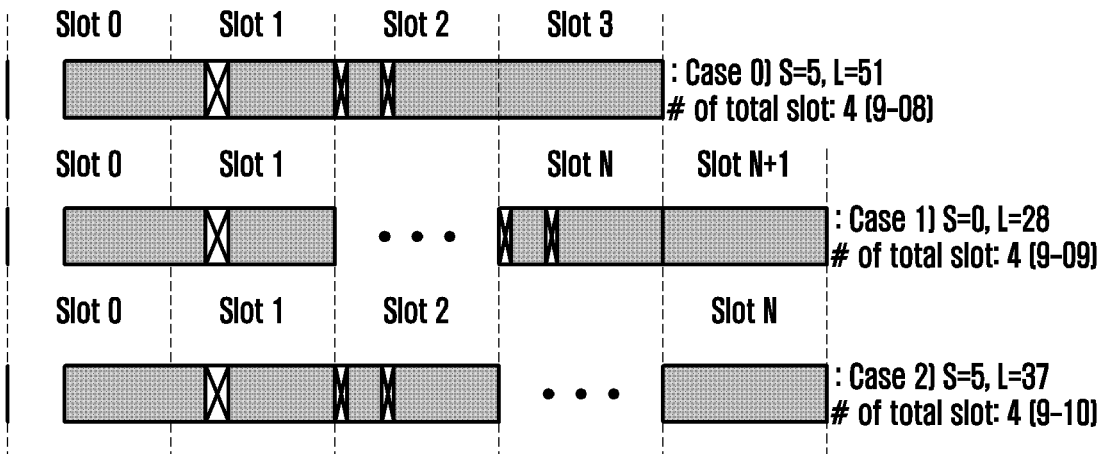

FIG. 13

TRANSMISSION AND RECEPTION METHOD AND DEVICE ON BASIS OF MAXIMUM DATA RATE IN COMMUNICATION SYSTEM

TECHNICAL FIELD

The disclosure relates to a communication system and, more specifically, to a method and a device for scheduling and transmitting or receiving data according to a data amount or a data rate which can be processed by a terminal.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 preprocessing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

In a wireless communication system, specifically, in an NR system, a data rate supportable by a terminal may be predetermined between a base station and the terminal. This may be calculated using a maximum frequency band, a maximum modulation order, a maximum number of layers, etc., supported by the terminal. The base station cannot perform, for the terminal, scheduling of the amount of data corresponding to an instant data rate higher than the calculated data rate. In addition, the scheduling of the base station and the data transmission or reception operation of the terminal may vary according to the method for calculating an instant data rate.

The NR system may provide not only data communication between the base station and the terminal but also data communication between terminals. In this case, a method for determining a data rate supportable by the terminal in the data communication between terminals is required. In addition, an operation of the terminal according to the determined data rate and scheduling information needs to be defined.

Solution to Problem

According to an embodiment of the disclosure, a method of a terminal in a communication system is provided. The method may include identifying a maximum data rate supported by the terminal, identifying an instant data rate, based on the number of slots corresponding to one transport block (TB), identifying whether a condition that the maximum data rate is greater than or equal to the instant data rate is satisfied, and transmitting or receiving data, based on whether the condition is satisfied.

According to an embodiment, a terminal of a communication system is provided. The terminal may include a transceiver, and a controller configured to identify a maximum data rate supported by the terminal, identify an instant data rate, based on the number of slots corresponding to one TB, identify whether a condition that the maximum data rate is greater than or equal to the instant data rate is satisfied, and transmit or receive data, based on whether the condition is satisfied.

Advantageous Effects of Invention

According to the disclosure, a terminal and a base station may can determine a maximum data rate during commination between terminals or communication between the terminal and the base station, and a device for performing scheduling can perform scheduling while not exceeding a maximum data rate supported by a counterpart terminal, thereby efficiently transmitting or receiving data.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

The above and other aspects, features, and advantages of the disclosure will be more apparent from the following description of embodiments of the disclosure in conjunction with the accompanying drawings.

4

Figure 6:
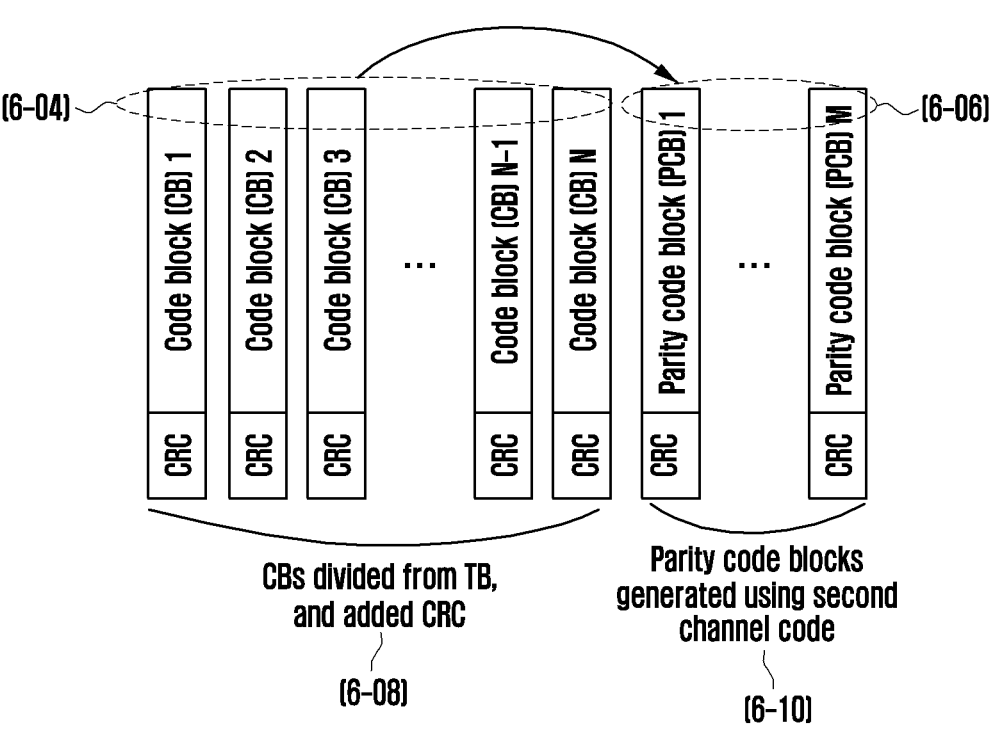

FIG. 6 illustrates a scheme of transmitting a signal by using an outer code according to an embodiment of the disclosure.

Figure 7:
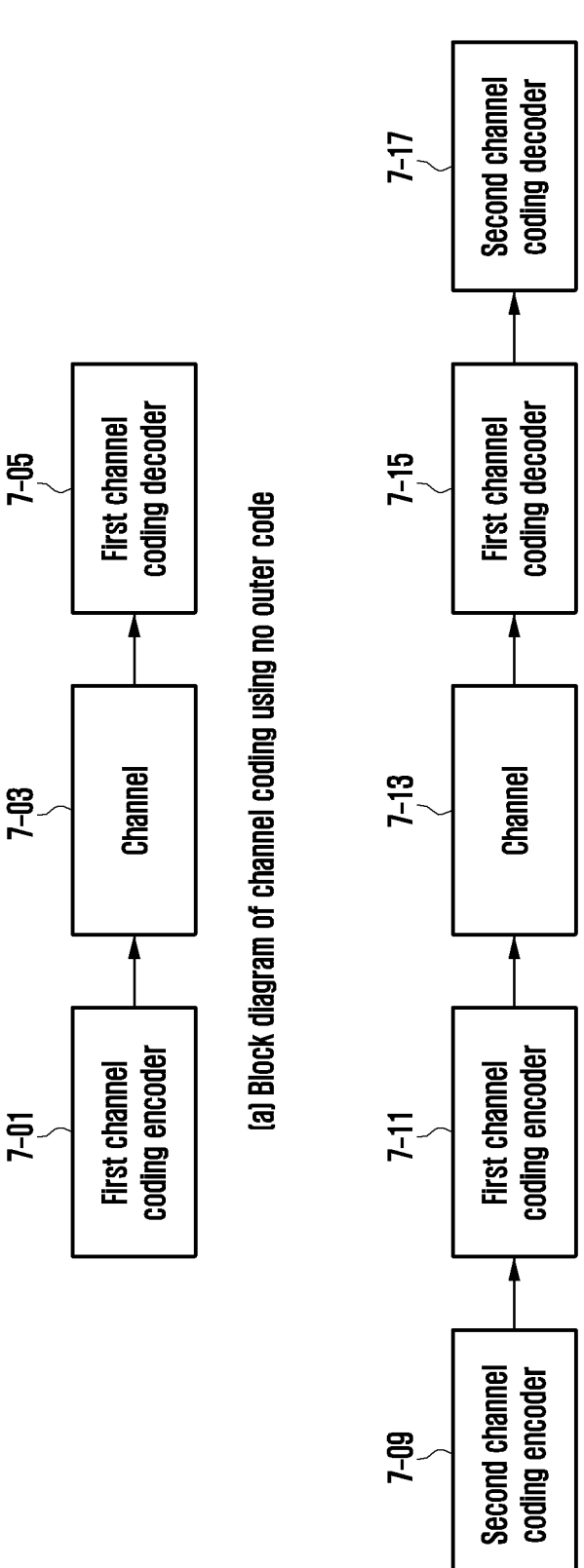

FIG. 7 is a block diagram illustrating a structure of a communication system in which an outer code is used according to an embodiment of the disclosure.

FIG. 8 illustrates a method for generating one or more parity code blocks by applying a second channel code or an outer code to several code blocks divided from one transport block according to an embodiment of the disclosure.

FIG. 9 illustrates multi-slot PUSCH transmission including one TB (TB processing over multi-slot (TBoMS)) in a 5G system according to an embodiment of the disclosure.

Figure 10:
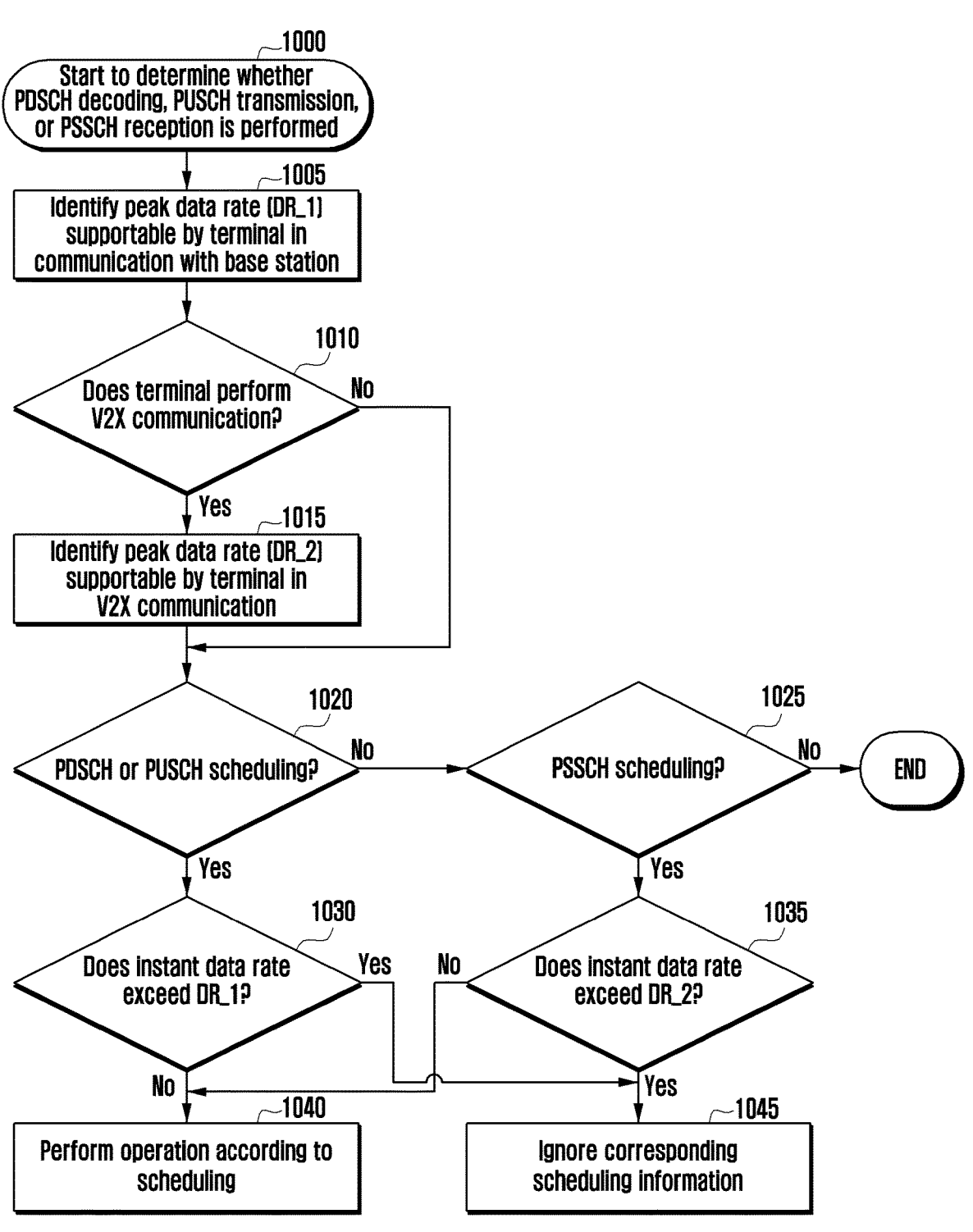

FIG. 10 is a flow chart illustrating a method for determining whether to perform PDSCH decoding, PUSCH transmission, and PSSCH reception of a terminal according to an embodiment of the disclosure.

Figure 11:
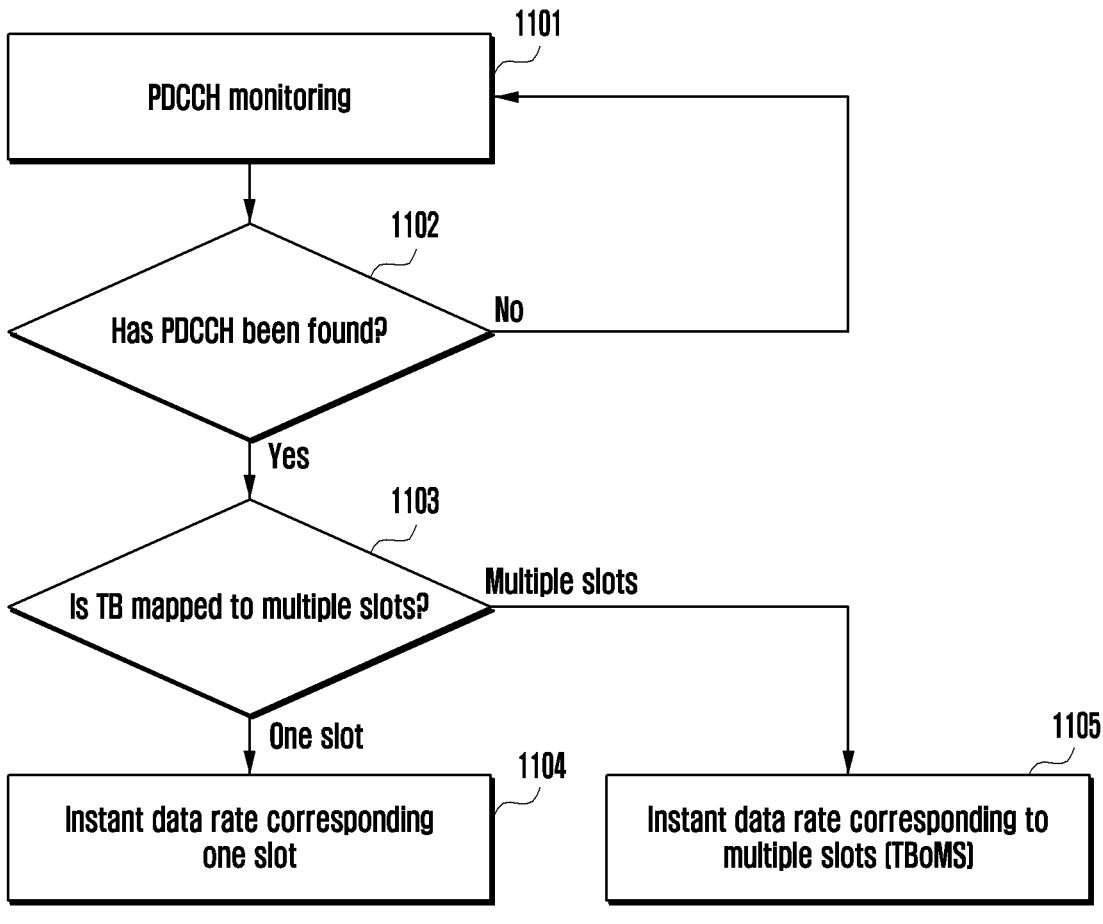

FIG. 11 illustrates a method for determining an instant data rate for downlink reception, uplink transmission, or sidelink transmission or reception according to an embodiment of the disclosure.

Figure 12:
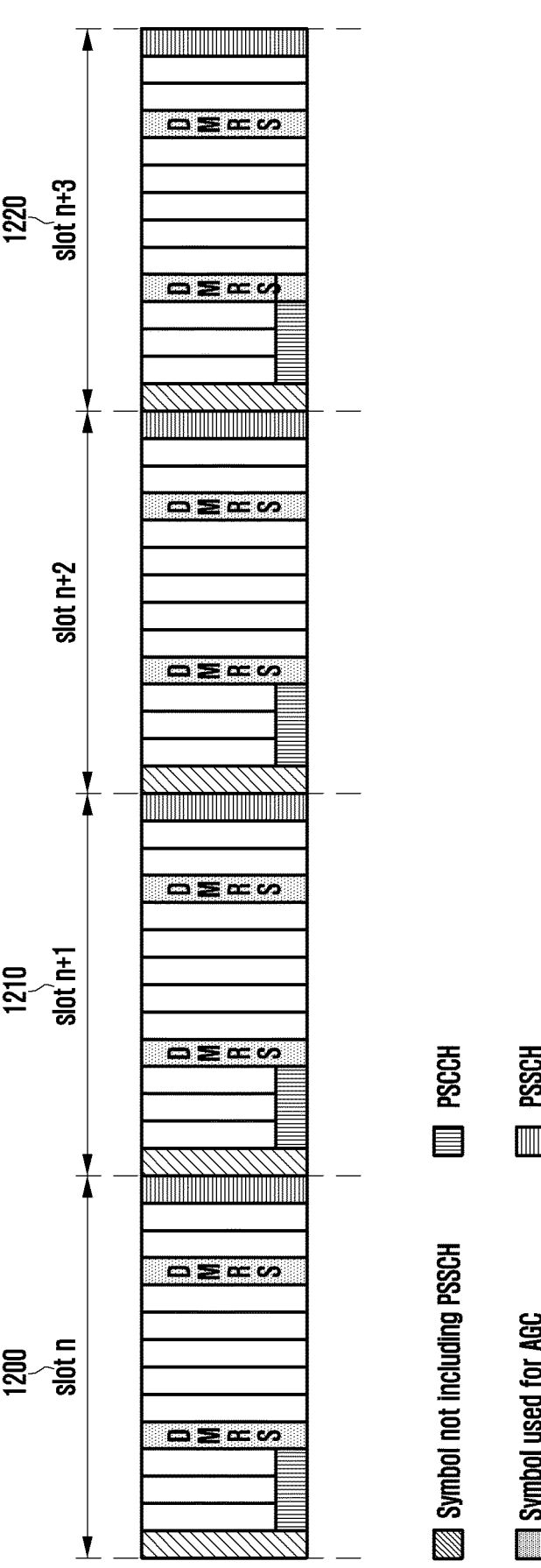

FIG. 12 illustrates an example in which a symbol or a channel for a sidelink is mapped to a slot and used according to an embodiment of the disclosure.

Figure 13:
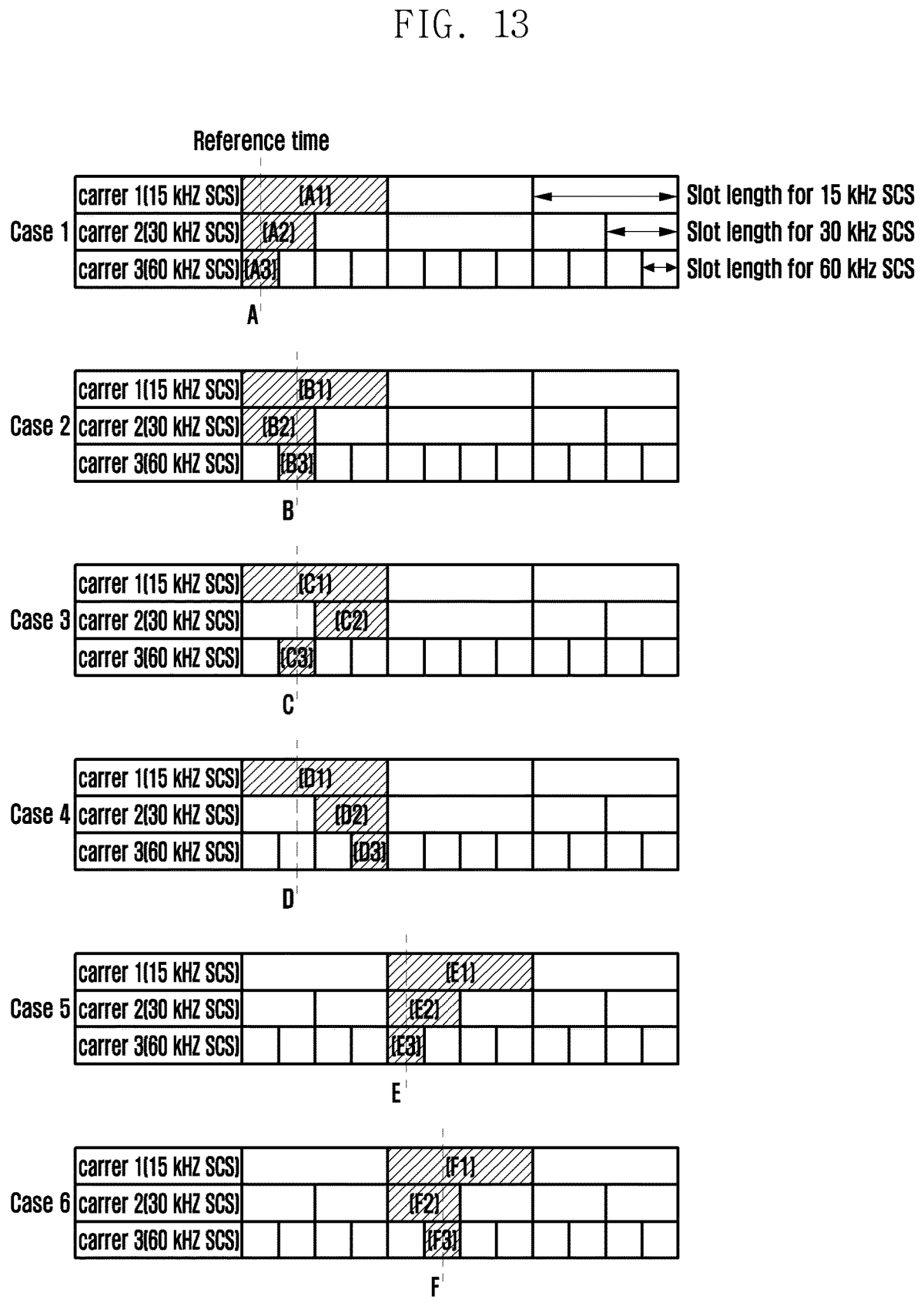

FIG. 13 illustrates an example of determining a slot including a specific time point in a carrier configured for a terminal via higher layer signaling according to an embodiment of the disclosure.

Figure 14:
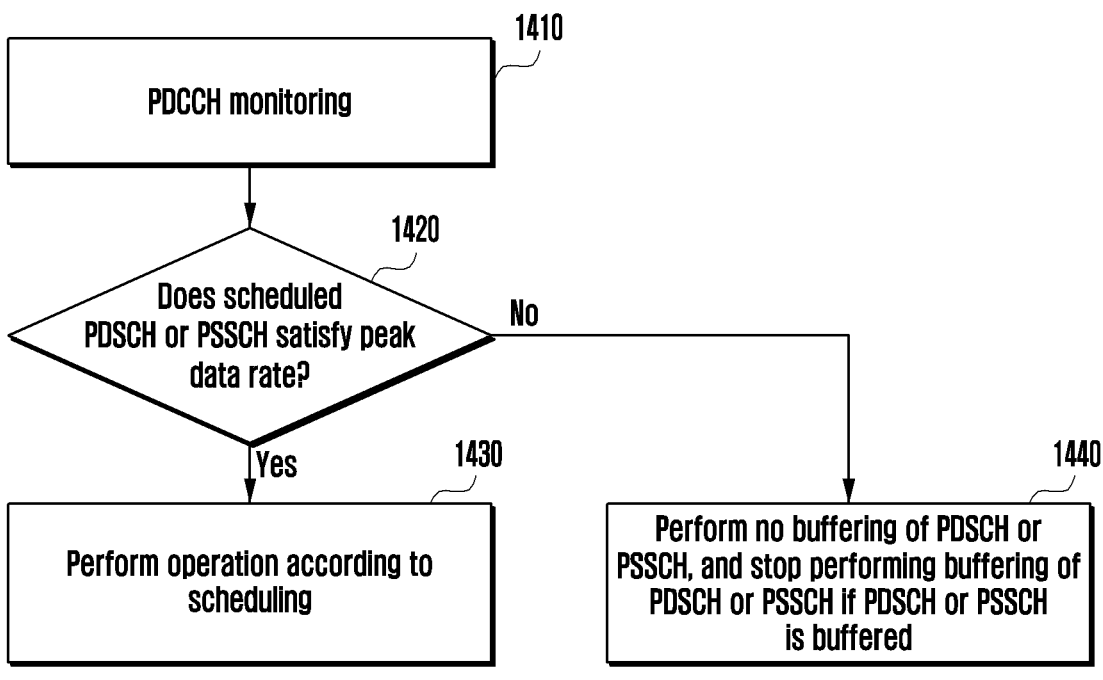

FIG. 14 illustrates a terminal operation for downlink reception or sidelink transmission or reception according to an embodiment of the disclosure.

Figure 15:
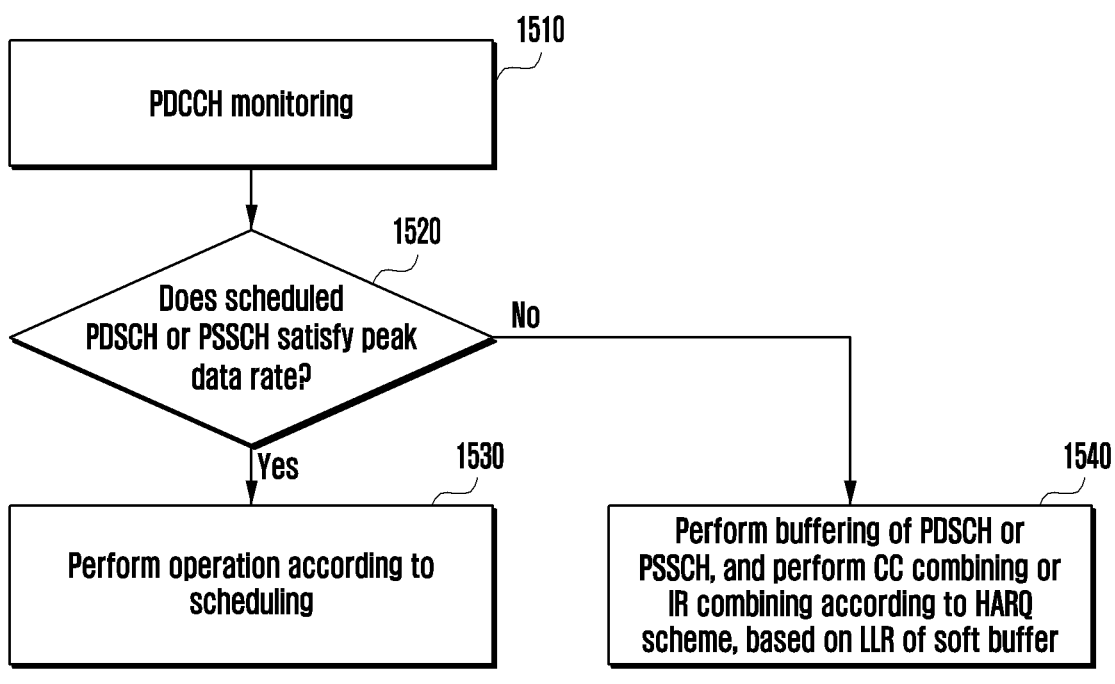

FIG. 15 illustrates a terminal operation for downlink reception or sidelink transmission or reception according to an embodiment of the disclosure.

Figure 16:
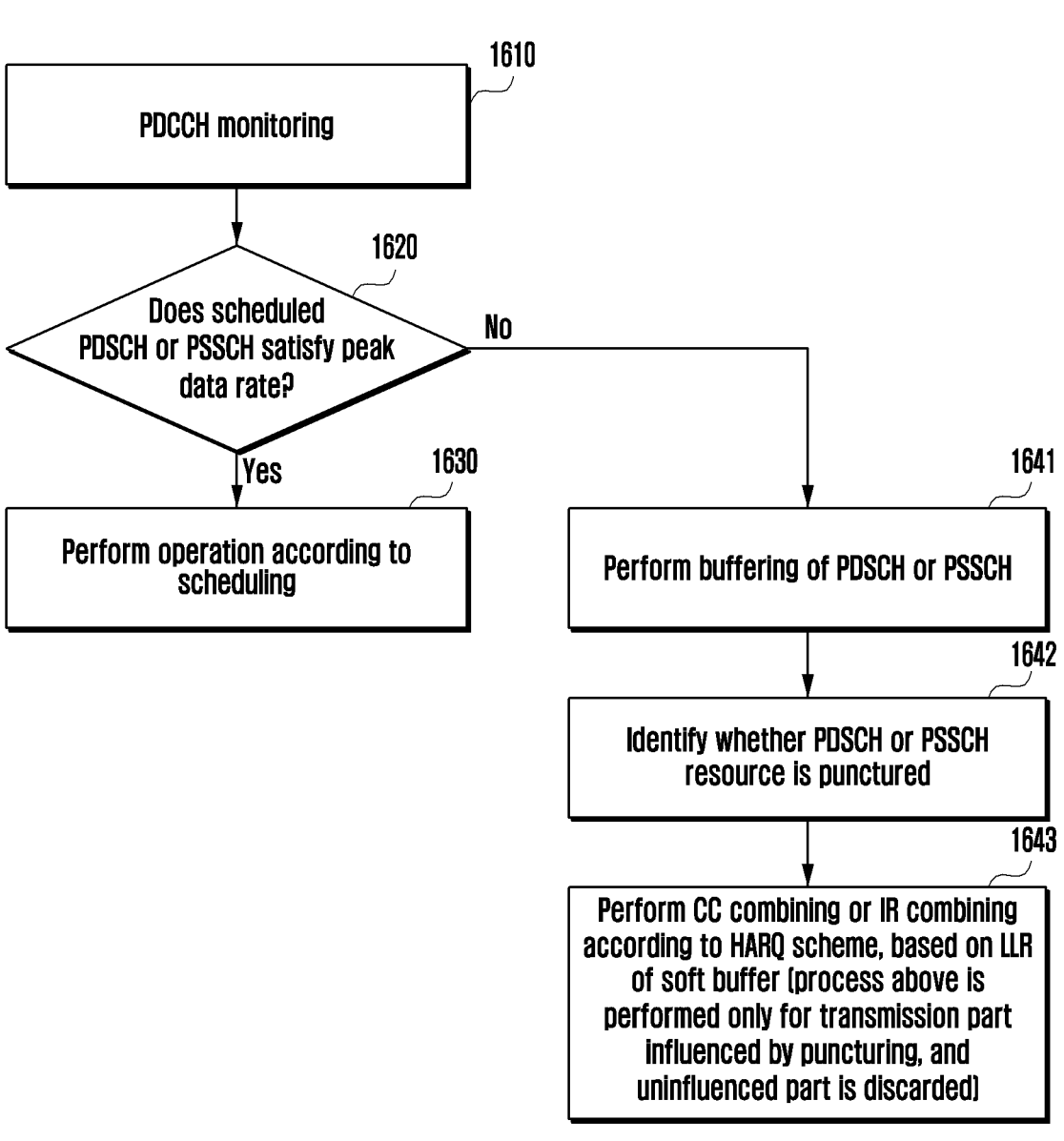

FIG. 16 illustrates a terminal operation for downlink reception or sidelink transmission or reception according to an embodiment of the disclosure.

Figure 17A:
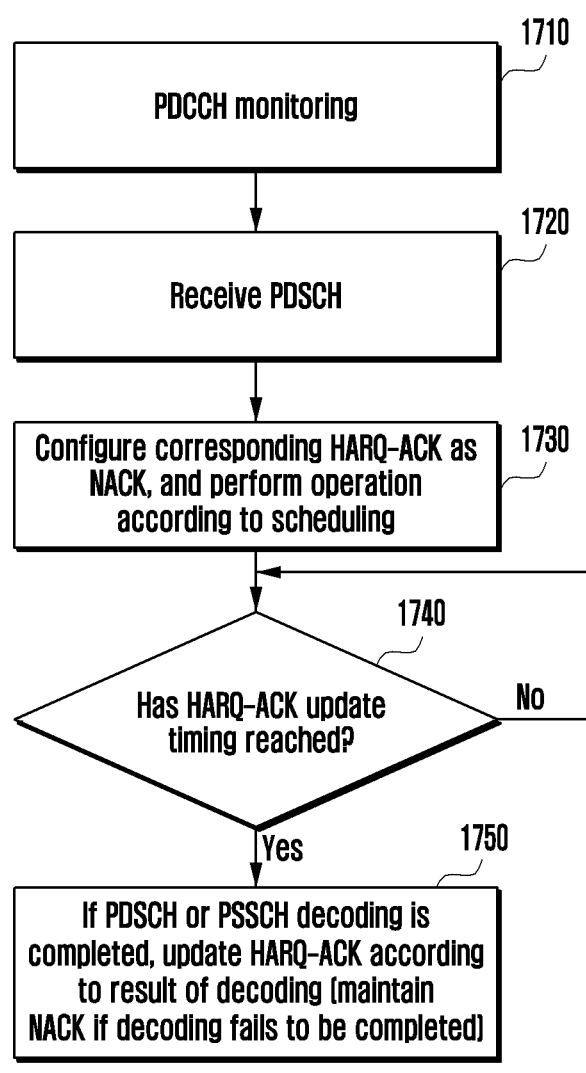

FIG. 17A illustrates a terminal operation for downlink reception or PSSCH transmission or reception according to an embodiment of the disclosure.

Figure 17B:
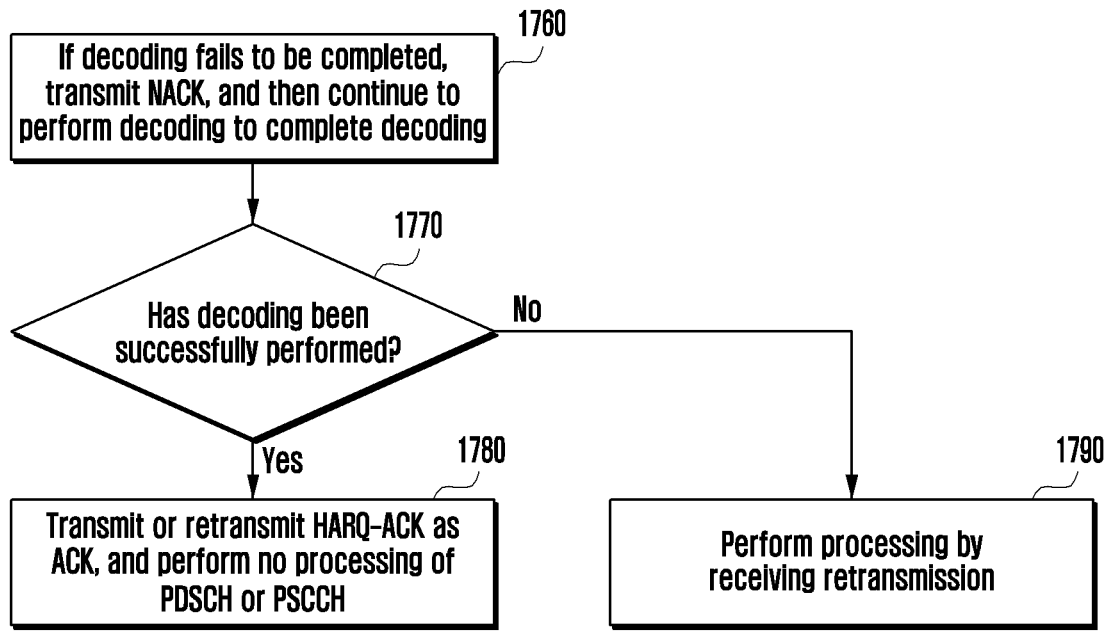

FIG. 17B illustrates a terminal operation for downlink reception or PSSCH transmission or reception according to an embodiment of the disclosure.

Figure 18:
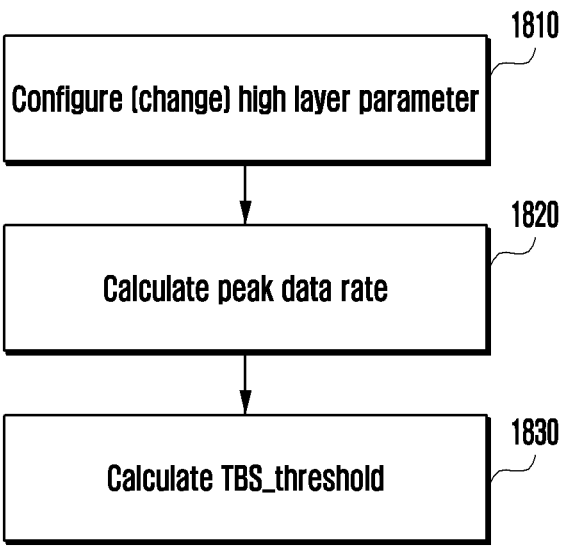

FIG. 18 illustrates an operation of a base station according to an embodiment of the disclosure.

Figure 19A:
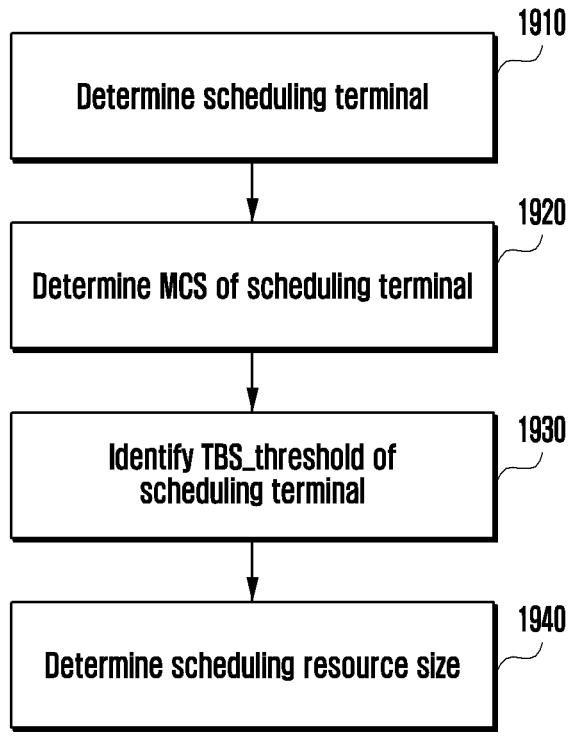

FIG. 19A illustrates an operation of a base station according to an embodiment of the disclosure.

Figure 19B:
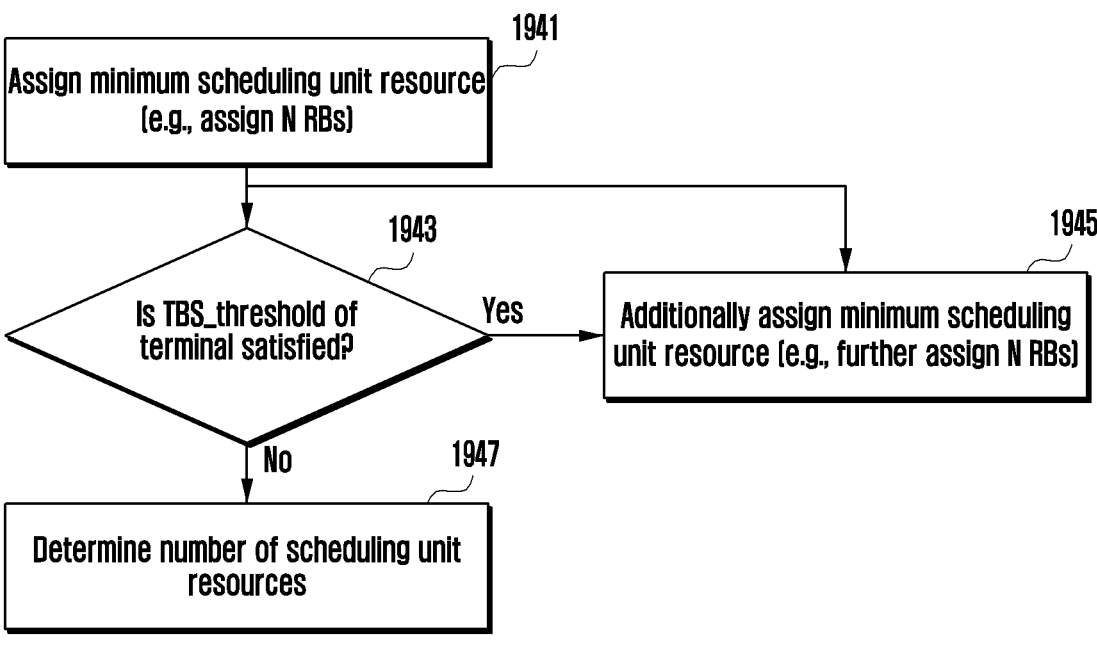

FIG. 19B illustrates an embodiment in which a base station determines a scheduling resource of a terminal according to an embodiment of the disclosure.

Figure 20:
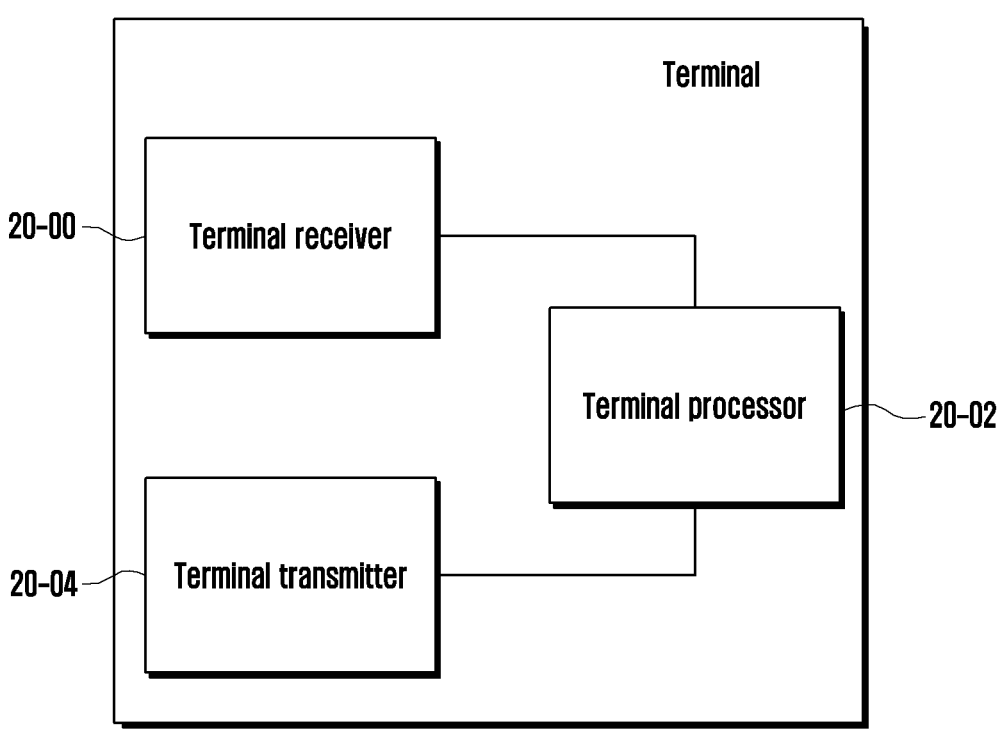

FIG. 20 is a block diagram illustrating a terminal according to an embodiment of the disclosure.

Figure 21:
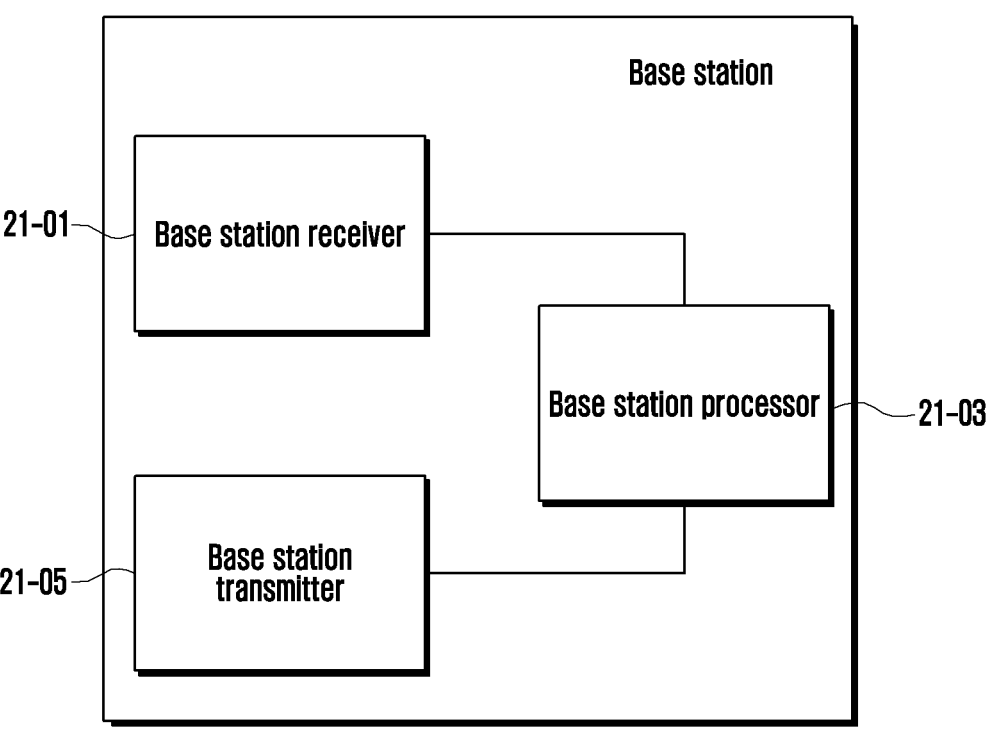

FIG. 21 is a block diagram illustrating a base station according to an embodiment of the disclosure.

MODE FOR THE INVENTION

New radio (NR) access technology corresponding to new 5G communication is designed so that various services are freely multiplexed in time and frequency resources, and accordingly, a waveform, numerology, a reference signal, or the like, may be assigned dynamically or freely according to the needs of corresponding services. In order to provide an optimal service to a terminal in wireless communication, it is important to perform data transmission optimized through measurements of channel quality and interference, and accordingly, it is essential to accurately measure a channel state. However, unlike 4G communication for which the channel and interference characteristics are not dramatically changed depending on a frequency resource, the channel and interference characteristics are dramatically changed depending on a service in a case of a 5G channel, and thus subset support in a frequency resource group (FRG) dimension is required in order to separately measure the same. Meanwhile, the types of services supported in the NR system may be categorized into enhanced mobile broadband (eMBB), massive machine type communications (mMTC), and ultra-reliable and low-latency communications (URLLC). The eMBB may be a service that targets high-speed a transmission of high-capacity data, the mMTC may be a service that targets minimizing power consumption by a terminal and access of multiple terminals, and The URLLC may be a service that targets high-reliability and low-latency. Different requirements may be applied depending on the type of service applied to a terminal.

Recently, with the development of research on a next-generation communication system, various schemes for scheduling communication with a terminal have been discussed. Accordingly, there is a need for an efficient scheduling and data transmission/reception scheme considering the characteristics of the next-generation communication system.

As such, multiple services may be provided to a user in a communication system, and thus a method capable of providing respective services within the same time interval according to a feature in order to provide the multiple services to a user and an apparatus using the same may be required.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

A wireless communication system is evolving from the initial voice-based service to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services. Furthermore, standards for 5G or new radio (NR) systems as the 5th generation wireless communication system are now under development.

As a typical example of the broadband wireless communication system, the NR system employs an orthogonal frequency division multiplexing (OFDM) scheme in a downlink (DL) and an uplink (UL). More specifically, the NR system employs a cyclic-prefix OFDM (CP-OFDM) scheme in a downlink and employs two schemes, that is, the CP-OFDM scheme and discrete Fourier transform spreading (DFT-S-OFDM) scheme in an uplink. The uplink indicates a radio link through which a user equipment (UE) or a mobile station (MS) transmits data or control signals to a base station (BS) or (gNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

The NR system employs a hybrid automatic repeat request (HARQ) scheme in which, when decoding is unsuccessful at the initial transmission, the corresponding data is retransmitted in a physical layer. In the HARQ scheme, when a receiver fails to accurately decode data, the receiver transmits information (negative acknowledgement: NACK) informing a transmitter of the unsuccessful decoding and thus the transmitter may retransmit the corresponding data in the physical layer. The receiver may increase data reception performance by combining the data retransmitted by the transmitter with the data the decoding of which has previously failed. Also, when the receiver accurately decodes data, the receiver transmits information (acknowledgement: ACK) informing the transmitter of the successful decoding and thus the transmitter may transmit new data.

Figure 1:
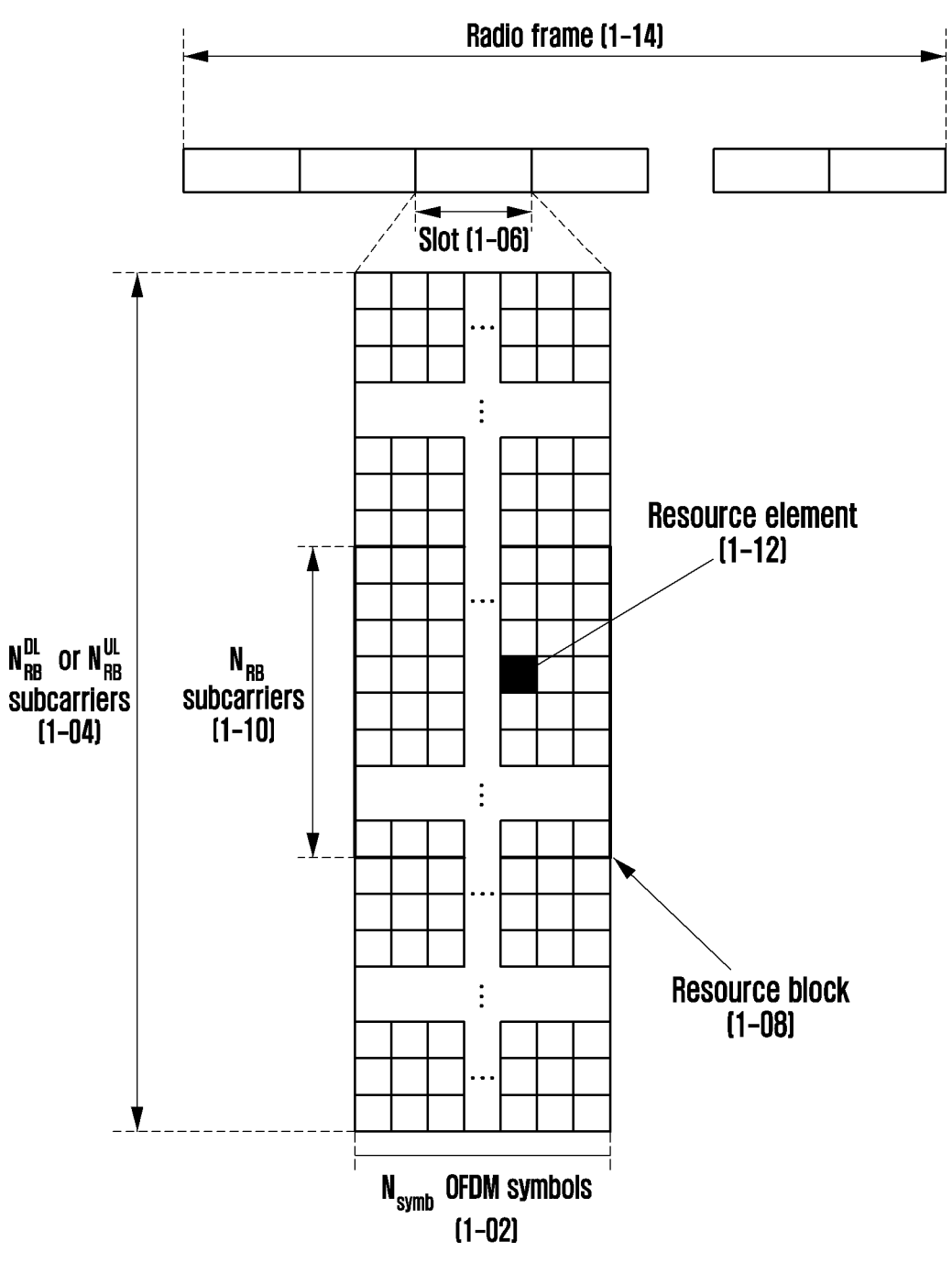
FIG. 1 illustrates a basic structure of a time-frequency domain which is a radio frequency area in which a data or control channel is transmitted in downlink or uplink of an NR system to which the disclosure is applicable.

FIG. 1 illustrates a basic structure of a time-frequency domain which is a radio frequency area in which a data or width corresponding to a system transmission bandwidth. Table 1 indicates the relationship between a system transmission bandwidth and a channel bandwidth defined in the LTE system corresponding to the 4$^{th}$ generation wireless communication before the NR system. For example, in the LTE system having a channel bandwidth of 10 MHz, the transmission bandwidth may include 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The NR system may operate in a channel bandwidth wider than the channel bandwidth of the LTE, presented in Table 1.

The bandwidth of the NR system may have a configuration as shown in Table 2 or 3. Specifically, Table 2 shows a configuration of a bandwidth of frequency range 1 (FR1), and Table 3 shows a configuration of a bandwidth of frequency range 2 (FR2).

TABLE 2

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 | control channel is transmitted in downlink or uplink of an NR system to which the disclosure is applicable.

In FIG. 1, the horizontal axis indicates a time domain, and the vertical axis indicates a frequency domain. A minimum transmission unit in the time domain is an OFDM symbol, and Nsymb OFDM symbols 1-02 may constitute one slot 1-06. The length of one subframe may be defined as 1.0 ms, and a radio frame 1-14 may be defined as 10 ms. A minimum transmission unit in the frequency domain is a subcarrier, and an entire system transmission bandwidth may include a total of $N_{RB}^{DL}$ or $N_{RB}^{UL}$ subcarriers 1-04.

A basic unit of a resource in the time-frequency domain is a resource element (RE) 1-12 and may be indicated by an OFDM symbol index and a subcarrier index. A resource block (RB or physical resource block (PRB)) 1-08 may be defined as $N_{symb}$ successive OFDM symbols 1-02 in the time domain and $N_{RB}$ successive subcarriers 1-10 in the frequency domain. Accordingly, one RB 1-08 may include Nsymb×$N_{RB}$ REs. In general, a minimum transmission unit of data is an RB unit. In the NR system, generally, Nsymb=14, $N_{RB}$=12, and $N_{RB}^{DL}$, $N_{RB}^{UL}$, and NRB are proportional to a system transmission bandwidth. In addition, a data rate may increase in proportion to the number of RBs scheduled for the terminal.

In the NR system, in a case of an FDD system that operates by separating the downlink and the uplink from each other by frequency, a downlink transmission bandwidth and an uplink transmission bandwidth may be different from each other. A channel bandwidth may indicate an RF band-

TABLE 3

| | Channel bandwidth $BW_{channel}$ [MHz] | | | |
|---|---|---|---|---|
| | Subcarrier width | 50 MHz | 100 MHz | 200 MHz | 400 MHz |
| Transmission bandwidth configuration $N_{RB}$ | 60 kHz | 66 | 132 | 264 | N/A |
| | 120 kHz | 32 | 66 | 132 | 264 |

In the NR system, the frequency range may be defined to be divided into FR1 and FR2. FR1 means, for example, 450 MHz to 7125 MHz, and FR2 means 24250 MHz to 52600 MHz.

The range of FR1 and FR2 may be changed differently and applied. For example, the frequency range of FR1 may be changed from 450 MHz to 7125 MHz and applied.

In the NR system, scheduling information of downlink data and uplink data may be transferred from a base station to a terminal through downlink control information (DCI). The DCI may be defined according to various formats, and each of the formats may indicate whether the DCI corresponds to scheduling information (UL grant) of the uplink data or scheduling information (DL grant) of the downlink data, whether the DCI is compact DCI having small size control information, whether the DCI applies spatial multiplexing using multiple antennas, and whether the DCI is DCI for controlling power, etc. For example, DCI format 1-1 corresponding to scheduling control information of downlink data (DL grant) may at least include one of the following control information pieces.

Carrier indicator: indicates a frequency carrier used for transmission.

DCI format indicator: is an indicator for distinguishing whether the corresponding DCI is for downlink or uplink.

Bandwidth part (BWP) indicator: indicates a BWP used for transmission.

Frequency-domain resource allocation indicates an RB of a frequency domain allocated for data transmission. A resource to be represented is determined according to a system bandwidth and a resource allocation scheme.

Time-domain resource allocation: indicates an OFDM symbol of a slot and the slot in which a data-related channel is to be transmitted.

VRB-to-PRB mapping: indicates a scheme of mapping a virtual RB (VRB) and a physical RB (PRB).

Modulation and coding scheme (MCS): indicates a modulation scheme and a coding rate used for data transmission. That is, a coding rate value may be indicated, wherein the coding rate value enables informing of a transport block size (TBS) and channel coding information, in addition to information on whether the modulation scheme is QPSK, 16QAM, 64QAM, and 256QAM.

Code block group (CBG) transmission information: indicates information on a CBG to be transmitted when CBG retransmission is configured.

HARQ processor number: indicates a process number of HARQ.

New data indicator: indicates whether transmission is HARQ initial transmission or retransmission.

Redundancy version: indicates a redundancy version of HARQ.

Transmission power control (TPC) command for physical uplink control channel (PUCCH): indicates a transmission power control command for a PUCCH corresponding to an uplink control channel.

symbol position S at the corresponding slot, and the number L of OFDM symbols to which the PUSCH is mapped. Here, S may be a relative position from starting of the slot, L may be the number of consecutive symbols, and S and L may be determined from a start and length indicator value (SLIV) defined as follows.

$$
\begin{aligned}
&\text{If } (L-1) \leq 7 \text{ then} \\
&\quad SLIV = 14 \cdot (L-1) + S \\
&\text{else} \\
&\quad SLIV = 14 \cdot (14 - L + 1) + (14 - 1 - S) \\
&\text{where } 0 < L \leq 14 - S
\end{aligned}
$$

In the NR system, in general, information (for example, in the form of a table) including, in one row, information on an SLIV value, a PDSCH, a PUSCH mapping type, a PDSCH, and a slot in which a PUSCH is transmitted may be configured via an RRC configuration. Thereafter, in time domain resource assignment of DCI, the base station may transfer information on the SLIV value, the PDSCH, the PUSCH mapping type, the PDSCH, and the slot in which the PUSCH is transmitted to the terminal by indicating an index value in the configured table.

In the NR system, type A and type B may be defined as a PUSCH mapping type. In PUSCH mapping type A, the first symbol among DMRS symbols may be positioned in the second or third OFDM symbol in the slot. In PUSCH mapping type B, the first symbol among DMRS symbols may be positioned in the first OFDM symbol in a time-domain resource allocated via PUSCH transmission.

In the NR system, type A and type B may be defined as the PDSCH mapping type. The first symbol among DMRS symbols may be positioned in the first symbol of the PDSCH.

Table 4 and Table 5 show a combination of S and L supported for the respective types of the PDSCH and the PUSCH.

TABLE 4

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

TABLE 5

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

In a case of PUSCH transmission, time-domain resource assignment may be transferred by information relating to a slot in which the PUSCH is transmitted, a starting OFDM DCI may be transmitted on a physical downlink control channel (PDCCH) (or control information, hereinafter, PDCCH and control information may be interchangeably used) which is a downlink physical control channel via channel coding and modulation.

In general, DCI is independently scrambled with a specific radio network temporary identifier (RNTI) (or a terminal identifier) for each terminal so as to have a cyclic redundancy check (CRC) added thereto, is channel-coded, and then may be configured as each independent PDCCH and transmitted. The PDCCH may be mapped to a control resource set (CORESET) configured for the terminal and transmitted.

Downlink data may be transmitted on a physical downlink shared channel (PDSCH) that is a physical channel for downlink data transmission. The PDSCH may be transmitted after a control channel transmission period, and scheduling information such as a specific mapping position, a modulation scheme, and the like, in the frequency domain, may be determined based on DCI transmitted via the PDCCH.

The base station notifies, via MCS in control information constituting the DCI, the terminal of a modulation scheme applied to the PDSCH to be transmitted and the size (TBS) of data to be transmitted. According to an embodiment, the MCS may include 5 bits or may include bits more or fewer than 5 bits. The TBS corresponds to a size before channel coding for error correction is applied to data (transport block (TB)) to be transmitted by the base station.

In the disclosure, a transport block (TB) may include a medium access control (MAC) header, a MAC control element (CE), one or more MAC service data units (SDUs), and padding bits. According to another example, the TB may indicate a MAC protocol data unit (PDU) or a unit of data to be transferred from a MAC layer to a physical layer.

The modulation schemes supported in NR system are quadrature phase shift keying (QPSK), 16 quadrature amplitude modulation (QAM), 64QAM, and 256QAM, which correspond to modulation orders Qm of 2, 4, 6, and 8, respectively. That is, 2 bits per symbol may be transmitted in a case of QPSK modulation, 4 bits per OFDM symbol may be transmitted in a case of 16QAM modulation, 6 bits per symbol may be transmitted in a case of 64QAM modulation, and 8 bits per symbol may be transmitted in a case of 256QAM modulation.

Figure 2:
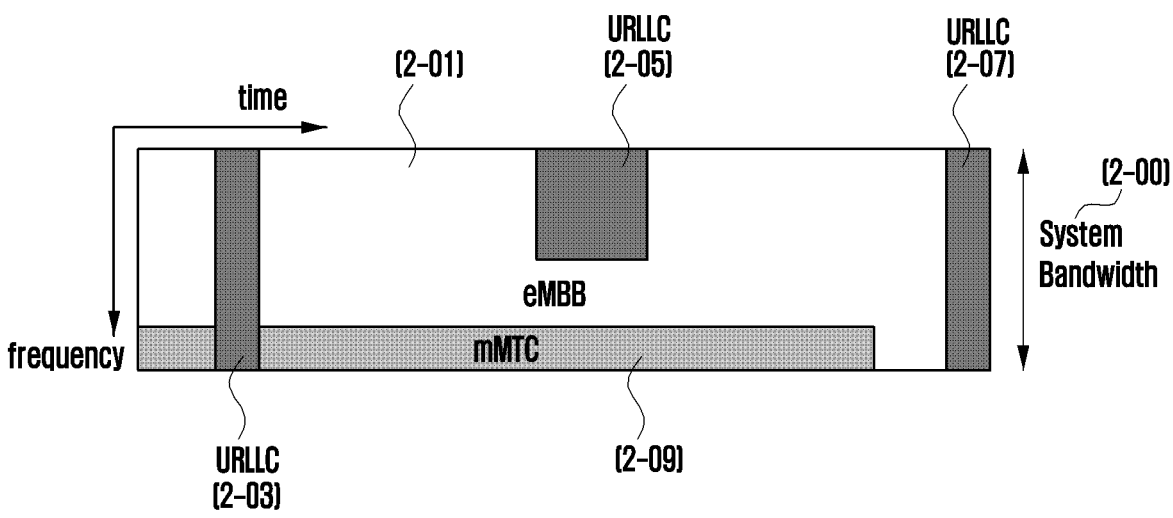
FIG. 2 illustrates assigning, in frequency-time resources, data for enhanced mobile broadband (eMBB), ultra-reliable and low latency communications (URLLC), and massive machine type communications (mMTC) corresponding to services considered in an NR system (or a 5G system) to which the disclosure is applicable.
Figure 3:
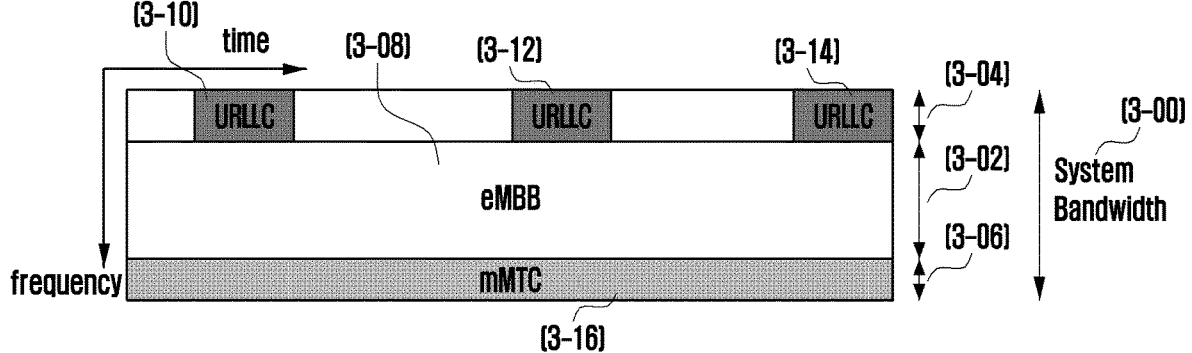
FIG. 3 illustrates assigning, in frequency-time resources, data for eMBB, URLLC, and mMTC corresponding to services considered in an NR system (or a 5G system) to which the disclosure is applicable.

FIG. 2 and FIG. 3 illustrate assigning, in frequency-time resources, data for eMBB, URLLC, and mMTC corresponding to services considered in an NR system to which the disclosure is applicable.

A scheme of assigning frequency and time resources for information transmission in each system may be identified through FIG. 2 and FIG. 3.

First, FIG. 2 illustrates assigning data for eMBB, URLLC, and mMTC in an entire system frequency band 2-00. When URLLC data 2-03, 2-05, and 2-07 are generated while eMBB data 2-01 and mMTC data 2-09 are assigned in a specific frequency band and transmitted, and the URLLC data 2-03, 2-05, and 2-07 need to be transmitted, a base station or a terminal may empty or may not transmit parts where the eMBB data 2-01 and the mMTC data 2-09 have been already assigned, and may transmit the URLLC data 2-03, 2-05, and 2-07. Among the above-mentioned services, URLLC needs to reduce a latency time, and thus the URLLC data 2-03, 2-05, and 2-07 may be assigned to a part of a resource, to which the eMBB data 2-01 has been assigned, so as to be transmitted. If the URLLC data 2-03, 2-05, and 2-07 is further assigned and transmitted in the resource to which the eMBB data 2-01 has been assigned, the eMBB data may not be transmitted in an overlapping time-frequency resource, and accordingly, transmission performance of the eMBB data may be reduced. That is, in such a case, an eMBB data transmission failure due to assignment of URLLC data may occur.

FIG. 3 illustrates a method of dividing an entire system frequency band 3-00 and transmitting service and data in respective subbands 3-02, 3-04, and 3-06. Information related to the subband configuration may be pre-determined, and the information may be transmitted from a base station to a terminal through higher signaling. According to another example, the information related to the subbands may be randomly divided by a base station or a network node, and services may be provided to a terminal without transmitting separate subband configuration information. In FIG. 3, it is assumed that the subband 3-02 is used for transmission of eMBB data 3-08, the subband 3-04 is used for transmission of URLLC data 3-10, 3-12, and 3-14, and the subband 3-06 is used for transmission of mMTC data 3-16.

In an embodiment of the disclosure, the length of a transmission time interval (TTI) used for transmission of URLLC data may be shorter than the length of a TTI used for transmission of eMBB data or mMTC data. In addition, a response of information related to URLLC data may be transmitted faster than eMBB data or mMTC data, and accordingly, information may be transmitted or received with low delay. The structure of a physical layer channel used for each type to transmit the above-described three types of service or data may be different. For example, at least one of the length of a transmission time interval (TTI), an assignment unit of a frequency resource, the structure of a control channel, and a mapping method of data may be different.

The three types of services and the three types of data have been assumed and illustrated in the above-described embodiments, but more types of services and corresponding data may be present, and even in this case, the contents of the disclosure may be applied.

In order to describe a method and a device proposed in the disclosure, terms "physical channel" and "signal" in the NR system may be used. However, the contents of the disclosure may be applied to not only the NR system but also other wireless communication systems.

Figure 4:
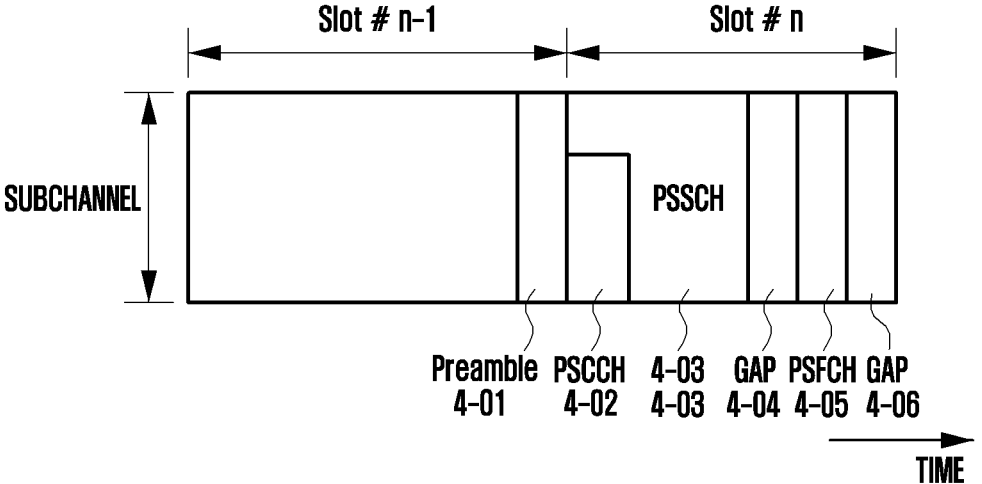
FIG. 4 illustrates an example of a channel structure of a slot used for sidelink communication in a wireless communication system to which the disclosure is applicable.

FIG. 4 illustrates an example of a channel structure of a slot used for sidelink communication in a wireless communication system to which the disclosure is applicable.

FIG. 4 illustrates an example in which a preamble 4-01, a PSCCH 4-02, a PSSCH 4-03, a gap symbol 4-04, a PSFCH 4-05, and a gap symbol 4-06 are transmitted in one slot. In the description above, the preamble may be used for automatic gain control (AGC), etc., and a symbol such as a PSCCH and a PSSCH may be copied and mapped. The gap symbol may be used for a time required for transmission or reception switching of the terminal, and the PSFCH may not exist according to a configuration of the PSFCH.

Figure 5:
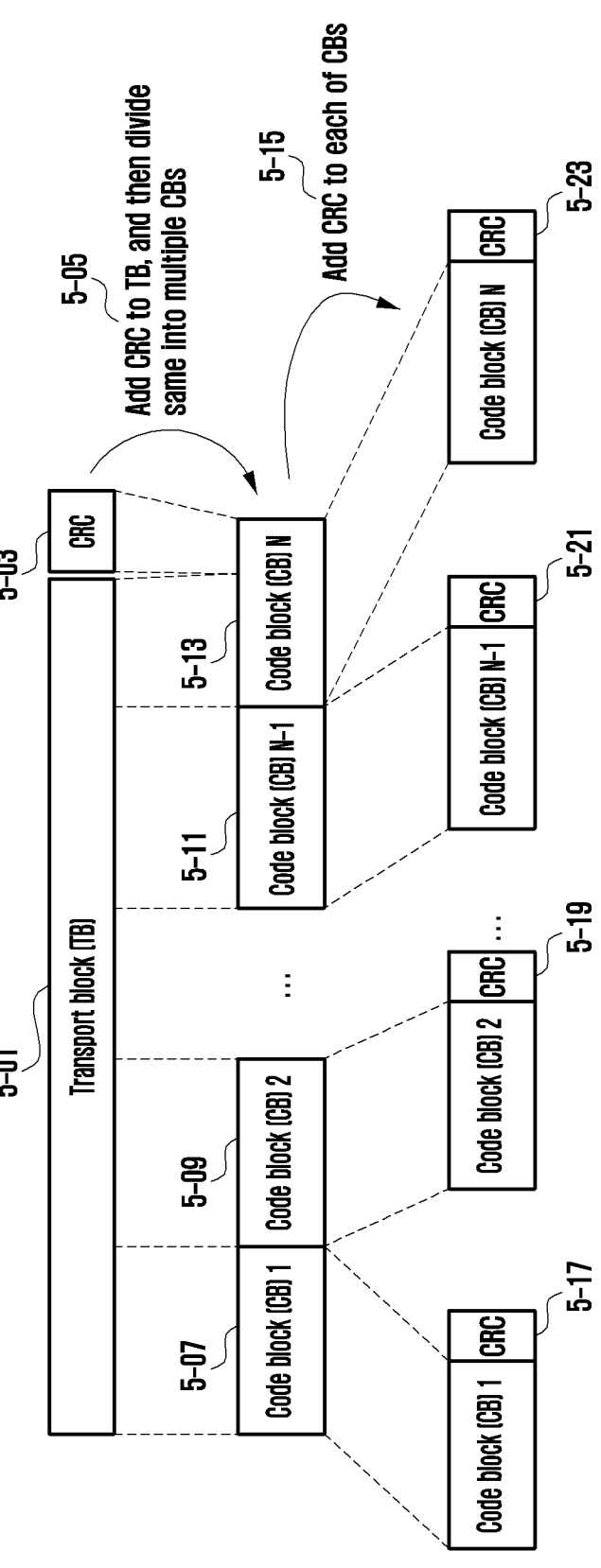
FIG. 5 illustrates a process in which one transport block is divided into several code blocks and a cyclic redundancy check (CRC) is added according to an embodiment of the disclosure.

FIG. 5 illustrates a process in which one transport block is divided into several code blocks and a CRC is added according to an embodiment of the disclosure.

Referring to FIG. 5, a CRC 5-03 may be added to the head or tail of one TB 5-01 which is to be transmitted via uplink or downlink. The CRC 5-03 may have 16 bits, 24 bits, or a pre-fixed number of bits, or have a variable number of bits depending on a channel context, etc., and may be used to determine whether channel coding succeeds. The TB 5-01 and a block to which the CRC 5-03 is added may be divided into several code blocks (CBs) 5-07, 5-09, 5-11, and 5-13 (operation 5-05). Here, the maximum sizes of the code blocks may be predetermined and divided, and in this case, the size of the last code block 5-13 may be smaller than those of other code blocks 5-07, 5-09, and 5-11. However, this is only an example, and according to another example, 0, a random value, or 1 may be inserted into the last code block 5-13 so that the last code block 5-13 and the other code blocks 5-07, 5-09, and 5-11 have the same length.

CRCs 5-17, 5-19, 5-21, and 5-23 may be added to the code blocks 5-07, 5-09, 5-11, and 5-13, respectively (operation 5-15). The CRC may have 16 bits, 24 bits, or a pre-fixed number of bits, and may be used to determine whether channel coding succeeds.

The TB 5-01 and a cyclic generator polynomial may be used to generate the CRC 5-03, and the cyclic generator polynomial may be defined in various ways. For example, assuming that a cyclic generator polynomial for a 24-bit CRC meets gCRC24A(D)=D24+D23+D18+D17+D14+ D11+D10+D7+D6+D5+D4+D3+D+1, and L=24, for TB data $a_0$, $a_1$, $a_2$, $a_3$, . . . , $a_{A-1}$, CRC $p_0$, $p_1$, $p_2$, $p_3$, . . . , $p_{L-1}$ may be determined as a value having the remainder as 0 when $a_0D^{A+23}+a_1D^{A+22}+$ . . . $a_{A-1}D^{24}+p_0D^{23}+$ $p_1D^{22}+$ . . . $+p_{22}D^1+p_{23}$ is divided by gCRC24A(D). In the above-described example, the CRC length L is assumed as 24, for example, but the CRC length L may be determined to be various lengths such as 12, 16, 24, 32, 40, 48, 64, etc., and the disclosure is not limited thereto.

After the CRC is added to the TB through this process, the TB+CRC may be divided into N CBs 5-07, 5-09, 5-11, and 5-13. CRCs 5-17, 5-19, 5-21, and 5-23 may be added to the divided CBs 5-07, 5-09, 5-11, and 5-13, respectively (operation 5-15). The CRCs added to the CBs may have different lengths than the CRC added to the TB, or a different cyclic generator polynomial may be used to generate the CRC. However, the CRC 5-03 added to the TB and the CRCs 5-17, 5-19, 5-21, and 5-23 added to the code blocks may be omitted depending on the type of a channel code to be applied to the code blocks. For example, if an LDPC code, rather than a turbo code, is applied to the code blocks, the CRCs 5-17, 5-19, 5-21, and 5-23 to be added to each of the code blocks may be omitted.

However, even when the LDPC is applied, the CRCs 5-17, 5-19, and 5-23 may be added to the code blocks. Furthermore, when a polar code is used, the CRCs may also be added or omitted.

As described above in FIG. 5, the maximum length of one code block is determined depending on the type of a channel coding applied to the TB to be transmitted, and depending on the maximum length of the code block, the TB and the CRC added to the TB may be divided into code blocks.

In the conventional LTE system, CRCs for CB are added to the divided CBs, and the data bits of the CBs and the CRCs are encoded with channel codes, so that coded bits may be determined, and the number of bits to be rate-matched may be determined as previously agreed on the respective coded bits.

FIG. 6 illustrates a scheme of transmitting a signal by using an outer code according to an embodiment of the disclosure. In addition, FIG. 7 is a block diagram illustrating a structure of a communication system in which an outer code is used according to an embodiment of the disclosure.

Referring to FIGS. 6 and 7, a method of transmitting a signal by using an outer code is described.

In FIG. 6, one transport block may be divided into several code blocks, then bits or symbols 6-04 in the same position in each of the code blocks may be encoded with a second channel code, and parity bits or symbols 6-06 may be generated (operation 6-02). Thereafter, CRCs may be added to each of the code blocks and the parity code blocks generated through second channel code encoding (operations 6-08 and 6-10).

Whether to add the CRC may be determined according to the type of the channel code. For example, when a turbo code is used for a first channel code, the CRCs 6-08 and 6-10 may be added, but thereafter, each of the code blocks and the parity code blocks may be encoded through first channel code encoding. In the disclosure, as the first channel code, a convolutional code, an LDPC code, a turbo code, a polar code, etc. may be used. However, this is only an example, various channel codes may be used for the first channel code. In the disclosure, as a second channel code, for example, a Read-Solomon code, a BCH code, a raptor code, a parity bit generation code, etc. may be used. However, this is only an example, and as the second channel code, various channel codes may be applied to the disclosure.

Referring to part (a) of FIG. 7, when an outer code is not used, each of a first channel code encoder 7-01 and a first channel coding decoder 7-05 may be only used in a transceiver, and a second channel coding encoder and a second channel coding decoder may not be used. Even when the outer code is not used, the first channel coding encoder 7-01 and the first channel coding decoder 7-05 may be configured the same as a case to be described below where the outer code is used.

Referring to part (b) of FIG. 7, when the outer code is used, data to be transmitted may pass through a second channel code encoder 7-09. A bit or symbols having passed through the second channel coding encoder 7-09 may pass through the first channel coding encoder 7-11. After the channel-coded symbols pass through a channel 7-13 and are received in a receiver, the receiver may sequentially operate a first channel coding decoder 7-15 and a second channel coding decoder 7-17, based on a received signal. The first channel coding decoder 7-15 and the second channel coding decoder 7-17 may perform operations corresponding to the first channel coding encoder 7-11 and the second channel coding encoder 7-09, respectively.

FIG. 8 illustrates a method for generating one or more parity code blocks by applying a second channel code or an outer code to several code blocks divided from one transport block according to an embodiment of the disclosure.

As described in FIG. 5 above, one transport block may be divided into one or more code blocks. In this case, when only one code block is generated according to the size of a transport block, a CRC may not be added to the corresponding code block. When an outer code is applied to code blocks to be transmitted, parity code blocks 8-40 and 8-42 may be generated (operation 8-24). When the outer code is used the parity code blocks 8-40 and 8-42 may be positioned after the last code block (operation 8-24). After the application of the outer code, CRCs -26, 8-28, 8-30, 8-32, 8-34, and 8-36 may be added (operation 8-38). Thereafter, each code block and parity code block may be encoded with a channel code together with the CRC.

In the NR system to which the disclosure is applicable, a TB size (i.e., TBS) may be calculated through the following stages.

Stage 1: $N'_{RE}$, which is the number of REs assigned to PDSCH mapping in one PRB in an assigned resource, is calculated.

$N'_{RE}$ may be calculated according to $$N_{SC}^{RB} \cdot N_{symb}^{sh} - N_{DMRS}^{PRB} - N_{oh}^{PRB}.$$

Here, $$N_{SC}^{RB}$$

and $$N_{symb}^{sh}$$

may indicate the number of OFDM symbols assigned to a PDSCH.

$$N_{DMRS}^{PRB}$$

denotes the number of REs in one PRB, occupied by a DMRS of the same CDM group.

$$N_{oh}^{PRB}$$

denotes the number of REs, occupied by the overhead in one PRB and configured via higher layer signaling, and may be configured as one of 0, 6, 12, and 18. Thereafter, $N_{RE}$, which is a total number of REs assigned to the PDSCH, may be calculated. $N_{RE}$ is calculated according to $\min(156, N_{RE}')\cdot n_{PRB}$, and $n_{PRB}$ indicates the number of PRBs assigned to a terminal.

Stage 2: $N_{info}$, which is the number of temporary information bits, may be calculated according to $N_{RE}\cdot R\cdot Q_m\cdot v$. Here, R denotes a cod rate, Qm denotes a modulation order, and information on this value may be transferred by using an MCS bit field and previously agreed table in control information. In addition, v is the number of assigned layers. If $N_{info}\leq 3824$, the TBS may be calculated through stage 3 below. Otherwise, the TBS may be calculated through stage 4.

Stage 3: $N'_{info}$ may be calculated through $$N'_{info} = \max\left(24, 2^n \cdot \left\lfloor \frac{N_{info}}{2^n} \right\rfloor\right)$$

and $n = \max(3, \lfloor \log_2(N_{info}) \rfloor - 6)$. The TBS may be determined to be a value closest to $N'_{info}$ among values not smaller than $N'_{info}$ in Table 6 below.

TABLE 6

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |

TABLE 6-continued

| Index | TBS |
|---|---|
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |

TABLE 6-continued

| Index | TBS |
|---|---|
| 92 | 3752 |
| 93 | 3824 |

Stage 4: $N'_{info}$ may be calculated through $$N'_{info} = \max\left(3840, \ 2^n \times \text{round}\left(\frac{N_{info} - 24}{2^n}\right)\right)$$

and $n = \lfloor \log_2(N_{info}-24) \rfloor - 5$.

The TBS may be determined through a value of $N'_{info}$ and [pseudo-code 1] below.

```
[Start Pseudo-code 1]
    if R ≤ 1/4
        TBS = 8·C·⌈(N'_info + 24)/(8·C)⌉ - 24, where C = ⌈(N'_info + 24)/3816⌉
    else
        if N'_info > 8424
            TBS = 8·C·⌈(N'_info + 24)/(8·C)⌉ - 24, where C = ⌈(N'_info + 24)/8424⌉
        else
            TBS = 8·⌈(N'_info + 24)/8⌉ - 24
        end if
[End Pseudo-code 1]
```

In the NR system to which the disclosure is applicable, when one CB is input to an LDPC encoder, parity bits may be added and output. In this case, the amount of the parity bits may vary according to an LDCP base graph. A method for transmitting all parity bits generated by LDPC coding for a specific input may be called full buffer rate matching (FBRM), and a method for limiting the number of transmittable parity bits may be called limited buffer rate matching (LBRM).

When resources are assigned for data transmission, an LDPC encoder output may be generated as a circular buffer, bits of the generated buffer may be repeatedly transmitted as many times as the number of the assigned resources, and in this case, the length of the circular buffer may be denoted by $N_{cb}$. When the number of all parity bits generated by the LDPC coding is N, $N_{cb}=N$ in the FBRM method. In the LBRM method, $N_{cb}$ is min (N, $N_{ref}$), $N_{ref}$ is given as $$\left\lfloor \frac{TBS_{LBRM}}{C \cdot R_{LBRM}} \right\rfloor,$$

and $R_{LBRM}$ may be determined to be 2/3. In the above-described method of obtaining a TBS, $TBS_{LBRM}$ indicates a maximum number of layers supported by a terminal in the corresponding cell, to obtain $TBS_{LBRM}$, the maximum modulation order configured for the terminal in the corresponding cell may be assumed, or 64QAM may be assumed when the maximum modulation order is not configured, the code rate may be assumed to be 948/1024 that is the maximum code rate, $N_{RE}$ may be assumed to be $156 \cdot n_{PRB}$, $n_{PRB}$ may be assumed to be $n_{PRB,LBRM}$, and $n_{PRB,LBRM}$ may be given as in Table 7 below.

TABLE 7

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system to which the disclosure is applicable, a maximum data rate supported by the terminal may be determined through Mathematical expression 1 below.

Mathematical expression 1 data rate (in $Mbps$) =

$$10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right)\right)$$

In Mathematical expression 1, J may denote the number of carriers grouped by carrier aggregation, $R_{max}=948/1024$, $$v_{Layers}^{(j)}$$

may denote a maximum number of layers, $$Q_m^{(j)}$$

may denote a maximum modulation order, $f^{(j)}$ may denote a scaling factor, and $\mu$ may denote a subcarrier spacing. $f^{(j)}$ may be reported to be one of 1. 0.8, 0.75, and 0.4 by the terminal, and $\mu$ may be given as in Table 8 below.

TABLE 8

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $$T_s^{\mu}$$

denotes an average OFDM symbol length, $$T_s^{\mu}$$

may be calculated according to $$\frac{10^{-3}}{14 \cdot 2^{\mu}},$$

and $$N_{PRB}^{BW(j),\mu}$$

denotes a maximum number of RBs in $BW^{(j)}$. $OH^{(j)}$ is an overhead value, which may be given as 0.14 in the downlink and 0.18 in the uplink of FR1 (a band of 6 GHz less), and may be given as 0.08 in the downlink and 0.10 in the uplink of FR2 (a band greater than 6 GHz). Through Mathematical expression 1, the maximum data rate in the downlink in a cell having a 100 MHz frequency bandwidth at a 30 kHz subcarrier spacing may be calculated as in Table 9 below.

TABLE 9

| $f^{(j)}$ | $v_{Layers}^{(j)}$ | $Q_m^{(j)}$ | $R_{max}$ | $N_{PRB}^{BW\,(j),\,\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

In contrast, the actual data rate which can be measured in actual data transmission by the terminal may be a value obtained by diving the amount of data by a data transmission time. This may be a value obtained by dividing a TBS in 1 TB transmission or a sum of TBSs in 2 TB transmission by the length of a TTI. For example, as in the assumption in Table 6, the actual maximum data rate in the downlink in a cell having a 100 MHz frequency bandwidth in a 30 kHz subcarrier spacing may be determined as shown in Table 10 below according to the number of assigned PDSCH symbols.

TABLE 10

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 3 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the terminal may be identified through Table 9, and the actual data rate according to the assigned TBS may be identified through Table 10. In this case, there may be a case where the actual data rate is greater than the maximum data rate according to scheduling information.

In the wireless communication system to which the disclosure is application, specifically, in the NR system, a data rate supportable by a terminal may be predetermined or pre-calculated between a base station and the terminal. This may be calculated using a maximum frequency band, a maximum modulation order, a maximum number of layers, etc., which are supported by the terminal. However, the calculated data rate may be different from a value calculated from the TB size (TBS) and the TTI length, which are used for actual data transmission.

Accordingly, there may be a case where the terminal is assigned a TBS greater than a value corresponding the data rate supported by the terminal itself. Such a case needs to be minimized, and in the case, an operation of the terminal needs to be defined. Accordingly, embodiments below provide a method and a device for solving a problem that a case where the maximum data rate supportable by the terminal and the actual data rate according to scheduling do not match may occur. In the disclosure, the maximum data rate may be a value determined based on the capability of the terminal, and the actual data rate may refer to a value determined based on scheduling information at the moment data is transmitted.

In the following embodiments, a base station is an entity that performs resource assignment of a terminal, and may be a base station that supports both vehicle to everything (V2X) communication and common cellular communication, or a base station that supports only V2X communication. That is, the base station may refer to a new generation Node B (gNB), an evolved Node B (eNB), a road site unit (RSU), a base station (BS), a radio access unit, a base station controller, or a stationary station. The terminal may be not only a general UE or a mobile station, but also one of a vehicle that supports vehicle-to-vehicle (V2V) communication, a vehicle or a pedestrian's headset (e.g., a smartphone) that supports vehicle-to-pedestrian (V2P) communication, a vehicle that supports vehicle-to-network (V2N) communication, a vehicle that supports vehicle-to-infrastructure (V2I) communication, an RSU equipped with a terminal function, an RSU equipped with a base station function, or an RSU equipped with a part of the base station function and a part of the terminal function.

In the disclosure, the conventional terms "physical channel" and "signal" may be interchangeably used with "data" or "control signal". For example, a PDSCH is a physical channel in which data is transmitted, but in the disclosure, the PDSCH may refer to data. In addition, a PSSCH is a physical channel in which data is transmitted, but in the disclosure, the PSSCH may refer to data.

Hereinafter, in the disclosure, higher layer signaling refers to a signal transfer method in which a signal is transferred from a base station to a terminal by using a downlink data channel of a physical channel, or is transferred from the terminal to the base station by using an uplink data channel of the physical layer, and may be also referred to as RRC signaling or a MAC control element (CE).

In the disclosure, the terms "peak data rate", "max data rate", "maximum data rate", etc. may be interchangeably used, and the disclosure is not limited thereto and a term having the same meaning may be used to refer to the terms.

[Description Related to TBoMS PUSCH Transmission]

FIG. 9 illustrates TB processing over multi-slot (TBoMS) PUSCH transmission in a 5G system according to an embodiment of the disclosure.

Referring to FIG. 9, one TB 9-01 may be assigned to multiple slots 9-02, 9-03, 9-04, and 9-05 and transmitted. In this case, it is possible to assign one TB resources of the multiple slots 9-02, 9-03, 9-04, and 9-05 so as to acquire a low code rate, thus acquire a channel coding gain, and improve channel coverage. In addition, referring to FIG. 9, as a time-domain resource assignment method for the TBoMS PUSCH transmission, a time-domain resource method 9-06 like PUSCH repetition type A and a time-domain resource assignment method 9-07 like PUSCH repetition type B may be applied. When resource assignment to a PUSCH for TBoMS is performed like PUSCH repetition type A, the PUSCH may be transmitted through multiple slots, each of which has the same symbol resource. On the other hand, when time-domain resource assignment to a PUSCH for TBoMS is performed like PUSCH repetition type B, resource assignment may be performed, as shown in Case 0 9-08, Case 1 9-09, and Case 2 9-10, according to the configured symbol length L through higher layer signaling and L1 signaling.

In the disclosure, described is a constraint determination method for a TBS or the like according to a maximum data rate when transmission of a PUSCH transmission in which one TB is assigned to multiple slots is configured in a 5G communication system. The PUSCH transmission (TB processing over multi-slot (TBoMS)) in which one TB is assigned to multiple slots according to an embodiment of the disclosure may be used to improve the performance of channel estimation through channel coding having a low code rate and improve channel coverage.

According to an embodiment of the disclosure, an operation method of a terminal for determining one TBS for a multi-slot physical uplink shared channel (PUSCH) and performing PUSCH occasion and redundancy version mapping of a multi-slot PUSCH including one TB, based on the PUSCH used when transmitting one TB to multiple slots, may include receiving, from a base station, multi-slot transmission (TBoMS) configuration information for transmitting a PUSCH including one TB to multiple slots, comparing a maximum data rate with a constraint condition in a case of the corresponding TBoMS from the base station, receiving TBS determination and PUSCH occasion and redundancy version configuration information of the PUSCH including one TB in the multiple slots, and configuring one TB for the multi-slot PUSCH according to the configured TBS determination and PUSCH occasion and redundancy version mapping method, in transmission of the multi-slot PUSCH including one TB, based on the configured TBS determination and PUSCH occasion and redundancy version configuration information, and transmitting the same to the base station.

According to the disclosure, a TBS constraint condition method for repetition transmission of a multi-slot PUSCH including one TB is described through embodiments below.

First Embodiment

According to this embodiment, the terminal may determine a maximum data rate by calculating a maximum data rate according to a communication counterpart or acquiring the same from a stored value. In addition, the determined maximum data rate may be used in comparison with the actual instant data rate. Such comparison may be performed according to Mathematical expression 2 below.

In Mathematical expression 2, the left side of the inequality sign may mean an instant data rate of scheduled data, and DataRateCC on the right side (which can be determined according to the capability of the terminal) may mean a maximum data rate in the corresponding cell of the terminal. As DataRateCC on the right side, each corresponding value may be used according to whether the scheduling is scheduling for transmission or reception to or from the base station, such the PDSCH or the PUSCH, or scheduling for transmission or reception to or from the terminal, such as the PSSCH.

$$\frac{\sum_{m=0}^{M-1} V_{j,m}}{L \times T_s^{\mu}} \leq DataRateCC \qquad \text{Mathematical expression 2}$$

In the mathematical expression above, L denotes the number of OFDM symbols assigned to the PDSCH or the PSSCH, and M denotes the number of TBs transmitted in the corresponding PDSCH or the PSSCH. In the mathematical expression above, L may include a symbol for AGC, transmitted by the terminal via sidelink. $T_s^{\mu}$ is calculated according to $$\frac{10^{-3}}{2^{\mu} \cdot N_{symb}^{slot}},$$

$\mu$ and is a subcarrier spacing used for transmission of the PDSCH or the PSSCH. With respect to the $m_{th}$ TB, $V_{j,m}$ is calculated based on $$C' \cdot \left\lfloor \frac{A}{C} \right\rfloor,$$

wherein A denotes a TB size (TBS), C denotes the number of code blocks (CBs) included in a TB, and C' denotes the number of code blocks scheduled in the corresponding TB. In a case of code block group (CBG) retransmission, C and C' may be different from each other. $\lfloor x \rfloor$ may denote the maximum integer not greater than x.

In the mathematical expression above, DataRateCC denotes the maximum data rate supported by the terminal in the corresponding carrier or serving cell, and may be determined based on Mathematical expression 1 above. Alternatively, DataRateCC may be calculated as in Mathematical expression 3 below.

$$\text{data rate (in } Mbps) = 10^{-6} \cdot v_{Layers}^{(j)} \cdot$$
$$Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right)$$

Mathematical expression 3

Mathematical expression 3 is a mathematical expression indicating an example of calculating DataRateCC of the $j^{th}$ serving cell.

In mathematical expression 3, Rmax=948/1024, $$v_{Layers}^{(j)}$$

may denote a maximum number of layers, $$Q_m^{(j)}$$

may denote a maximum modulation order, $f^{(j)}$ may denote a scaling factor, and $\mu$ may denote a subcarrier spacing. $f^{(j)}$ may be reported to be one value among 1, 0.8, 0.75, and 0.4, and $\mu$ may be given as in Table 8. In addition, $$T_s^{\mu}$$

denotes an average OFDM symbol length, $$T_s^{\mu}$$

may be calculated according to $$\frac{10^{-3}}{14 \cdot 2^{\mu}},$$

and $$N_{PRB}^{BW(j),\mu}$$

denotes a maximum number of RBs in $BW^{(j)}$. $OH^{(j)}$ denotes an overhead value, which may be given as 0.14 in the downlink and 0.18 in the uplink of FR1 (a band of 6 GHz or less), and may be given as 0.08 in the downlink and 0.10 in the uplink of FR2 (a band greater than 6 GHz).

With respect to $OH^{(j)}$, a different value may be applied for the sidelink, wherein a value such as OHsub6 in FR1 (a band of 6 GHz or less) and a value such as OHabove6 in FR2 (a band greater than 6 GHz). The value of OHsub6 may have a value equal to or greater than a specific value, regardless of the configuration of the PSFCH. For example, the value of OHsub6 may have a value greater than 2/12. Alternatively, the value of OH(j) may be determined by a higher layer configuration value. For example, one or more sidelink resource pools may be configured for the terminal for transmission or reception of a physical sidelink shared channel (PSSCH), and the value of OH(j) may be determined by a parameter of a resource pool having the largest bandwidth among the sidelink resource pools. For values other than $OH^{(j)}$, different values may be applied according to the link described in this embodiment above, that is, according to whether the link is a downlink, an uplink, or a sidelink.

According to an embodiment of the disclosure, whether the actual instant data rate satisfies the capability of the terminal may be identified according to a result of the calculation made based on Mathematical expression 4 below. In Mathematical expression 4 below, the left side of the inequality sign may mean an instant data rate of data transmitted in J serving cells at the moment of scheduling, and DataRate on the right side may mean the maximum data rate in J serving cells configured for the terminal according to the capability of the terminal. For DataRate on the right side, each corresponding value may be used according to whether the scheduling corresponds to scheduling for transmission or reception to or from the base station, such as the PDSCH or the PUSCH, or corresponds to scheduling for transmission or reception to or from the terminal, such as the PSSCH.

$$\sum_{j=0}^{J-1} \frac{\sum_{m=0}^{M-1} V_{j,m}}{T_{slot}^{\mu(j)}} \le DataRate$$

Mathematical expression 4

In the mathematical expression above, J denotes the number of serving cells configured for the corresponding terminal in the corresponding frequency range. For the $j^{th}$ serving cell, M denotes the number of TBs transmitted in slot s_j. In addition, the slot length of sj is defined as $T_{slot}^{\mu(j)}=10^{-3}/2^{\mu(j)}$, and $\mu^{(j)}$ denotes a subcarrier spacing used for the PDSCH or the PSSCH in slot sj in the $j^{th}$ serving cell. For the $m^{th}$ TB, $V_{j,m}$ is calculated according to $$C' \cdot \left\lfloor \frac{A}{C} \right\rfloor,$$

A denotes a TB size (TBS), C denotes the number of code blocks (CBs) included in a TB, and C' denotes the number of code blocks scheduled in the corresponding TB. In a case of CBG retransmission, C and C' may be different from each other. $\lfloor x \rfloor$ denotes the maximum integer not greater than x.

In the mathematical expression above, DataRate denotes the maximum data rate supported in J serving cells configured for the corresponding terminal, and may be determined based on Mathematical expression 1. The actual average transmission rate of the terminal in a specific time point (reference time) in Mathematical expression 4 may be determined in consideration of a sum of a total number of bits of a CB or a TB included in the PDSCH, the PUSCH, or the PSSCH in a slot including the corresponding time point. In the description above, the slot including the specific time point may be determined as in FIG. 13 to be described.

An example of determining whether Mathematical expression 2 or 4 is satisfied is described above, but in another example, one of or a combination of the following methods may be applied when the terminal receives scheduling through TBoMS.

Method 1: When performing retransmission of a specific TB, the terminal may identify whether a result of comparison between the maximum data rate and the instant data rate satisfies the following mathematical expression, instead of using Mathematical expression 2 above.

$$\frac{\sum_{m}^{M-1} V_{j,m}}{\max\left(L \times T_s^{\mu},\ T_{slot}^{\mu(j)}\right)} \le DataRateCC$$

The case of retransmission in the disclosure may correspond to a case where an MCS value indicated by the base station during scheduling does not include a code rate, and corresponds to a value including only a modulation order. This is for applying mitigated scheduling constraints in the case of TBoMs.

Method 2: The terminal may identify whether a result of comparison between the maximum data rate and the instant data rate satisfies the mathematical expression below, instead of using Mathematical expression 4.

$$\sum_{j=0}^{J-1} \frac{\sum_{m=0}^{M-1} V_{j,m}}{L \times T_s^{\mu}} \le DataRate$$

In the mathematical expression above, L denotes the number of OFDM symbols assigned to the PDSCH or the PSSCH, and M denotes the number of TBs transmitted in the corresponding PDSCH or the PSSCH.

$$T_s^{\mu}$$

is calculated according to $$\frac{10^{-3}}{2^{\mu} \cdot N_{symb}^{slot}},$$

and μ is a subcarrier spacing used for transmission of the PDSCH or the PSSCH.

$$T_s^{\mu}$$

may be determined to be a OFDM symbol length. This method may be used when one PUSCH is transmitted over several slots.

Method 3: When performing retransmission of a specific TB, the terminal may identify whether a result of comparison between the maximum data rate and the instant data rate satisfies the mathematical expression below, instead of using Mathematical expression 2.

$$\frac{\sum_{m}^{M-1} V_{j,m}}{\min\left(L \times T_s^{\mu},\ T_{slot}^{\mu(j)}\right)} \le DataRateCC$$

The case of retransmission in the disclosure may correspond to a case where an MCS value indicated by the base station during scheduling does not include a code rate, and corresponds to a value including only a modulation order. This is for applying mitigated scheduling constraints in the case of TBoMs.

According to an embodiment of the disclosure, when a maximum data rate in a corresponding serving cell of the terminal in a case of communication with the base station is DataRateCC1 and a maximum data rate in a corresponding serving cell of the terminal in a case of communication with another terminal is DataRateCC2, the terminal may determine a value applied to the right side of Mathematical expression 2 above according to a communication counterpart. When a maximum data rate in J serving cells of the terminal in a case of communication with the base station is DataRate1 and a maximum data rate in J serving cells of the terminal in a case of communication with another terminal is DataRate2, the terminal may determine a value applied to the right side of Mathematical expression 4 above according to a communication counterpart. When the actual instant data rate is greater than a value of DataRateCC or DataRate determined according to the communication counterpart, the terminal may skip a reception or transmission operation in the corresponding slot. That is, in the corresponding slot, the terminal may skip PDSCH reception and PUSCH transmission operations from the base station, or in the corresponding slot, the terminal may skip PSSCH transmission and reception operations. The operation of the terminal according to the embodiment above is described in detail with reference to FIG. 10 below.

FIG. 10 is a flow chart illustrating a method for determining whether to perform PDSCH reception, PUSCH transmission, and PSSCH transmission or reception of a terminal according to an embodiment of the disclosure.

Referring to FIG. 10, a terminal may identify a peak data rate (DR_1) supportable in communication with a base station (operation 1005). In FIG. 10, the peak data rate may include peak data rates in all serving cells or a peak data rate in a corresponding serving cell. The terminal may determine whether to perform V2X communication (operation 1010), and when the terminal needs to perform V2X communication, that is, when the terminal needs to perform direct communication with another terminal, the terminal may identify a peak data rate (DR_2) supportable by the terminal in V2X communication (direct communication with another terminal) (operation 1015). The terminal may monitor a PDDCH in a predetermined resource area such as a CORE-SET, and may identify whether a PDSCH or a PUSCH has been scheduled as a result of the PDCCH monitoring (operation 1020). When the PDSCH or the PUSCH is scheduled as a result of the PDCCH monitoring, the terminal may compare an instant data rate of the corresponding PDSCH or PUSCH with DR_1 (operation 1030), and may ignore the corresponding scheduling when the instant data rate exceeds DR_1 (operation 1045). Here, the comparing of the instant data rate of the corresponding PDSCH or PUSCH with DR_1 by the terminal may include identifying whether the above-mentioned mathematical expressions (for example, Mathematical expression 2, Mathematical expression 4, or a mathematical expression in a case of scheduling with TBoMS) are satisfied. In addition, ignoring the corresponding scheduling by the terminal may mean skipping a PDSCH reception operation or a PUSCH transmission operation. On the other hand (that is, when the instant data rate is less than or equal to DR_1), the terminal may perform the PDSCH reception operation or the PUSCH transmission operation according to the corresponding scheduling (operation 1040). When the PDSCH or the PUSCH is not scheduled as a result of the PDCCH monitoring, the terminal may determine whether the PSSCH has been scheduled (operation 1025). When the PSSCH is scheduled, the terminal may compare the instant data rate of the PSSCH with DR_2 (operation 1035), and may ignore the corresponding scheduling when the instant data rate exceeds DR_2 (operation 1045). Here, the comparing of the instant data rate of the PSSCH with DR_2 by the terminal may include identifying whether the above-mentioned mathematical expressions (for example, Mathematical expression 2 or Mathematical expression 4) are satisfied. In addition, when the terminal ignores the corresponding scheduling, it may mean that the terminal skips the transmission or reception operation of the PSSCH. On the other hand (that is, when the instant data rate is less than or equal to DR_2), the terminal may perform the transmission or reception operation of the PSSCH according to the corresponding scheduling (operation 1040).

Some of the operations of the terminal according to operations 1000 to 1045 illustrated in FIG. 10 may be omitted, and may be simultaneously performed. For example, as a result that the terminal determines whether to perform V2X communication (operation 1015), when it is identified that V2X communication is not performed, the terminal may skip identifying whether the PSSCH has been scheduled (operation 1025), and may skip comparing the instant data rate of the PSCCH with DR_2 (operation 1035).

Second Embodiment

According to an embodiment of the disclosure, when an instant data rate (DataRateinit) of the initial transmission is less than or equal to a maximum data rate (DataRate) in J serving cells configured for the terminal according to the capability of the terminal, the terminal may receive data through a PDSCH, transmit data through a PUSCH, or transmit or receive a PSSCH. A value of DataRateinit may be determined according to $$\sum_{j=0}^{J-1} \frac{\sum_{m=0}^{M-1} V_{j,m}}{T_{slot}^{\mu(j)}}.$$

According to an embodiment of the disclosure, when an instant data rate (DataRateRE) of retransmission is less than or equal to a maximum data rate (DataRateCC) in serving cell j configured for the terminal according to the capability of the terminal, the terminal may receive retransmission data through a PDSCH, transmit retransmission data through a PUSCH, or transmit or receive a PSSCH. A value of DataRateRE may be determined according to $$\frac{\sum_m^{M-1} V_{j,m}}{L \times T_s^\mu}.$$

According to an embodiment of the disclosure, an instant data rate (DataRateinit) of the initial transmission may be determined according to the number of slots in which data is transmitted. For example, the instant data rate may be determined according to the number of slots over which a PDSCH, a PSSCH, or a PUSCH for transmitting at least one TB is transmitted. That is, the instant data rate may be determined according to the number of slots over which a TB is transmitted. A first instant data rate (DataRateinit,1) in a case of transmission performed over one slot may be determined differently from a second instant data rate (DataRateinit,2) in a case of transmission performed over multiple slots. Upon scheduling of the base station, the instant data rate is determined to be either the first instant data rate (DataRateinit,1) or the second instant data rate (DataRateinit,2), and the determined instant data rate may be used for comparison with the maximum data rate (DataRate) in J serving cells configured for the terminal according to the capability of the terminal. In an embodiment of the disclosure, a value of the first instant data rate (DataRateinit,1) may be determined according to $$\sum_{j=0}^{J-1} \frac{\sum_{m=0}^{M-1} V_{j,m}}{T_{slot}^{\mu(j)}},$$

and the second instant data rate (DataRateinit,2) may be determined according to $$\sum_{j=0}^{J-1} \frac{\sum_{m=0}^{M-1} V_{j,m}}{L \times T_s^\mu}.$$

L corresponds to the number of transmission symbols of one PDSCH, PSSCH, or PUSCH. When counting the number of symbols corresponding to L, the number of DMRS symbols included in each data transmission channel may be included. Alternatively, when counting the number of symbols corresponding to L, the number of DMRS symbols included in each data transmission channel may not be included. When counting the number of symbols corresponding to L, a symbol for AGC may be included in a case of the sidelink. Alternatively, when counting the number of symbols corresponding to L, a symbol for AGC may not be included in a case of the sidelink.

According to an embodiment of the disclosure, the instant data rate (DataRateinit) of the initial transmission may be determined according to the number of symbols in which data is transmitted, the mapping location of the symbol, and/or the mapping method of the symbol. For example, the instant data rate may be determined according to the number of symbols over which a PDSCH, a PSSCH, or a PUSCH for transmitting at least one TB is transmitted, the mapping location of the symbol, and/or the mapping method of the symbol. That is, the instant data rate may be determined according to the number of symbols over which the TB is transmitted, the mapping location of the symbol, and/or the mapping method of the symbol. The number of symbols in which data is transmitted, the mapping location of the symbol, and/or the mapping method of the symbol may be configured for the terminal via L1 signaling and/or higher layer signaling. That is, the base station may determine the number of symbols, the mapping location of the symbol, and/or the mapping method of the symbol, and transmit L1 signaling and/or higher layer signaling to at least one terminal according to the determination. The terminal may identify the number of symbols, the mapping location of the symbol, and/or the mapping method of the symbol, based on the received L1 signaling and/or higher layer signaling, and accordingly, may identify the instant data rate. The identified instant data rate may include $$\sum_{j=0}^{J-1} \frac{\sum_{m=0}^{M-1} V_{j,m}}{T_{slot}^{\mu(j)}} \text{ and } \sum_{j=0}^{J-1} \frac{\sum_{m=0}^{M-1} V_{j,m}}{L X T_s^\mu}.$$

According to an embodiment of the disclosure, at least one parameter included in a ConfiguredGrantConfig information element (IE) may indicate type 2 ConfiguredGrant PUSCH transmission over multiple slots or type2 ConfiguredGrant PUSCH transmission over one slot, and the instant data rate may be determined according to the parameter.

According to an embodiment of the disclosure, at least one parameter included in an SL-ConfiguredGrantConfig information element (IE) may indicate type2 SL-ConfiguredGrant PSSCH transmission over multiple slots or type2 SL-ConfiguredGrant PSSCH over one slot, and the instant data rate may be determined based on the parameter.

According to an embodiment of the disclosure, an instant data rate (DataRateRE) of retransmission may be determined according to the number of slots in which data is transmitted. For example, the instant data rate may be determined according to the number of slots over which a PDSCH, a PSSCH, or a PUSCH for transmitting at least one TB is transmitted. That is, the instant data rate may be determined according to the number of slots over which a TB is retransmitted. The first instant data rate (DataRateRE, 1) in the case of transmission performed over one slot may be determined differently from the second instant data rate (DataRateRE,2) in the case of transmission over multiple slots. Upon scheduling of the base station, the instant data rate may be determined to be either the first instant data rate (DataRateRE,1) or the second instant data rate (DataRateRE,2), and the determined instant data rate may be used for comparison with the maximum data rate (DataRateCC) in serving cell j configured according to the capability of the terminal. In an embodiment of the disclosure, a value of the first instant data rate (DataRateRE,1) may be determined according to $$\frac{\sum_m^{M-1} V_{j,m}}{L X T_s^{\mu}},$$

and the second instant data rate (DataRateRE,2) may be determined according to $$\frac{\sum_m^{M-1} V_{j,m}}{fn\left(L X T_s^{\mu}, T_{slot}^{\mu(j)}\right)}.$$

Here, $$fn\left(L X T_s^{\mu}, T_{slot}^{\mu(j)}\right)$$

may correspond to one of $$\max\left(L X T_s^{\mu}, T_{slot}^{\mu(j)}\right)$$

and $$\min\left(L X T_s^{\mu}, T_{slot}^{\mu(j)}\right).$$

L may correspond to the number of transmission symbols of one PDSCH, PSSCH, or PUSCH. When counting the number of symbols corresponding to L, the number of DMRS symbols included in each data transmission channel may be included. Alternatively, when counting the number of symbols corresponding to L, the number of DMRS symbols included in each data transmission channel may not be included. When counting the number of symbols corresponding to L, a symbol for AGC may be included in a case of the sidelink. Alternatively, when counting the number of symbols corresponding to L, a symbol for AGC may not be included in a case of the sidelink.

According to an embodiment of the disclosure, the instant data rate (DataRateRE) of the retransmission may be determined according to the number of symbols in which data is transmitted, the mapping location of the symbol, and/or the mapping method of the symbol. For example, the instant data rate may be determined according to the number of symbols over which a PDSCH, a PSSCH, or a PUSCH for retransmitting at least one TB is transmitted, the mapping location of the symbol, and/or the mapping method of the symbol. That is, the instant data rate may be determined according to the number of symbols over which the retransmission TB is transmitted, the mapping location of the symbol, and/or the mapping method of the symbol. The number of symbols in which data is transmitted, the mapping location of the symbol, and/or the mapping method of the symbol may be configured for the terminal via L1 signaling and/or higher layer signaling. That is, the base station may determine the number of symbols, the mapping location of the symbol, and/or the mapping method of the symbol, and transmit L1 signaling and/or higher layer signaling to at least one terminal according to the determination. The terminal may identify the number of symbols, the mapping location of the symbol, and/or the mapping method of the symbol, based on the received L1 signaling and/or higher layer signaling, and accordingly, may identify the instant data rate. The identified instant data rate may include $$\frac{\sum_m^{M-1} V_{j,m}}{L X T_s^{\mu}} \text{ and } \frac{\sum_m^{M-1} V_{j,m}}{fn\left(L X T_s^{\mu}, T_{slot}^{\mu(j)}\right)},$$

and $$fn\left(L X T_s^{\mu}, T_{slot}^{\mu(j)}\right)$$

may correspond to one of $$\max\left(L X T_s^{\mu}, T_{slot}^{\mu(j)}\right)$$

and $$\min\left(L X T_s^{\mu}, T_{slot}^{\mu(j)}\right).$$

According to an embodiment of the disclosure, L may be a value determined according to the time-domain assignment method of TBoMS as in FIG. 9. For example, the value of L may be determined to be 9 in the case of 9-06 of FIG. 9, the value of L may be determined to be 51 in the case of 9-08, the value of L may be determined to be 28 in the case of 9-09, and the value of L may be determined to be 37 in the case of 9-10.

According to an embodiment of the disclosure, L may be the number of all symbols mapped to one TB. For example, the value of L may be determined to be 9*4=36 in the case of 9-06 of FIG. 9, the value of L may be determined to be 51 in the case of 9-08, the value of L may be determined to be 28 in the case of 9-09, and the value of L may be determined to be 37 in the case of 9-10.

FIG. 11 illustrates a method for determining an instant data rate for downlink reception, uplink transmission, or sidelink transmission or reception according to an embodiment of the disclosure.

Referring to FIG. 11, a terminal may perform PDCCH (or PSSCH) monitoring in a determined resource (operation 1101). When detecting a PDCCH (operation 1102), the terminal may identify whether at least one TB included in a PDSCH, a PUSCH, or a PSSCH scheduled through the PDCCH Is mapped to multiple slots, based on a value included in at least one bit field included in DCI (or SCI) transmitted through the PDCCH (operation 1103). When it is identified that at least one TB is mapped to one slot, the terminal may determine an instant data rate corresponding to one slot, as an instant data rate (operation 1104). Alternatively, when it is identified that at least one TB is mapped to multiple slots, the terminal may determine an instant data rate corresponding to the multiple slots, as an instant data rate (operation 1105).

$(2\text{-}1)^{th}$ Embodiment

According to an embodiment of the disclosure, when a PDSCH, a PUSCH, or a PSSCH including one TB is mapped to one slot and transmitted in the initial transmission and the one TB is mapped to multiple slots and retransmitted, an instant data rate (DataRateRE) of the retransmission may be determined according to $$\frac{\sum_m^{M-1} V_{j,m}}{LXT_s^\mu},$$

and the determined instant data rate may be used for comparison with a maximum data rate (DataRateCC) value in serving cell j.

According to an embodiment of the disclosure, when a PDSCH, a PUSCH, or a PSSCH including one TB is mapped to one slot and transmitted in the initial transmission and the one TB is mapped to multiple slots and retransmitted, an instant data rate (DataRateRE) of the retransmission may be determined according to $$\frac{\sum_m^{M-1} V_{j,m}}{fn(LXT_s^\mu, T_{slot}^{\mu(j)})},$$

and the determined instant data rate may be used for comparison with a maximum data rate (DataRateCC) value in serving cell j.

$$fn(L \, X \, T_s^\mu, \; T_{slot}^{\mu(j)})$$

may correspond to one of $$\max(L \, X \, T_s^\mu, \; T_{slot}^{\mu(j)})$$

and $$\min(L \, X \, T_s^\mu, \; T_{slot}^{\mu(j)}).$$

According to an embodiment of the disclosure, when a PDSCH, a PUSCH, or a PSSCH including one TB is mapped to multiple slots and transmitted in the initial transmission and the one TB is mapped to one slot and retransmitted, an instant data rate (DataRateRE) of the retransmission may be determined according to $$\frac{\sum_m^{M-1} V_{j,m}}{LXT_s^\mu},$$

and the determined instant data rate may be used for comparison with a maximum data rate (DataRateCC) value in serving cell j.

According to an embodiment, when a PDSCH, a PUSCH, or a PSSCH including one TB is mapped to multiple slots and transmitted in the initial transmission and the one TB is mapped to one slot and retransmitted, an instant data rate (DataRateRE) of the retransmission may be determined according to $$\frac{\sum_m^{M-1} V_{j,m}}{fn(LXT_s^\mu, T_{slot}^{\mu(j)})},$$

and the determined instant data rate may be used for comparison with a maximum data rate (DataRateCC) value in serving cell j.

$$fn(L \, X \, T_s^\mu, \; T_{slot}^{\mu(j)})$$

may correspond to one of $$\max(L \, X \, T_s^\mu, \; T_{slot}^{\mu(j)})$$

and $$\min(L \, X \, T_s^\mu, \; T_{slot}^{\mu(j)}).$$

Third Embodiment

In relation to scheduling of retransmission, for example, when it is limited that the condition of Mathematical expression 2 or Mathematical expression 4 needs to be satisfied even though the retransmission is performed, there is a possibility that a case where the retransmission fails to be scheduled may occur. Specifically, this will be described with reference to FIG. 12.

FIG. 12 illustrates an example in which a symbol or a channel for a sidelink is mapped to a slot and used according to an embodiment of the disclosure.

Referring to FIG. 12, when TB1 satisfies comparison between a maximum data rate and an instant data rate in slot n 1200, TB1 may be initially transmitted in slot n 1200. TB1 may fail to satisfy comparison between the maximum data rate and the instant data rate in slot n+1 1210 and slot n+3 1220. In such a case, TB1 cannot be retransmitted in slot n+1 1210 and slot n+3 1220. In addition, when one TB corresponds to TBoMS mapped to multiple slots, an instant data rate (DataRateRE) of the retransmission is determined according to $$\frac{\sum_{m}^{M-1} V_{j,m}}{\min\left(LXT_{s}^{\mu}, T_{slot}^{\mu(j)}\right)},$$

L is 15 or greater, many constraints on retransmission scheduling of the base station may occur.

Accordingly, according to an embodiment of the disclosure, the comparison between the maximum data rate and the instant data rate using of Mathematical expression 2 or Mathematical expression 4 may be applied differently according to whether the transmission is initial transmission or retransmission. For example, the comparison between the maximum data rate and the instant data rate using of Mathematical expression 2 or Mathematical expression 4 may be applied only to initial transmission between the terminal and another terminal, initial transmission from the terminal to the base station, or initial transmission from the base station to the terminal, and when at least a part of data included in the initial transmission is retransmitted, the terminal may not perform the comparison between the maximum data rate and the instant data rate. That is, the terminal may perform PSSCH transmission or reception, PDSCH reception, or PUSCH transmission without the comparison between the maximum data rate and the instant data rate in the case of the retransmission.

According to an embodiment of the disclosure, when an IMCS value for at least one TB in SCI transmitted through the PSCCH is greater than a specific value (W), the IMCS value may be considered for sidelink retransmission of the at least one TB. An MCS table to be used by the terminal may be configured via higher layer signaling such as mcs-Table-SL, and the specific value (W) corresponding to the retransmission may be determined according to the configured MCS table (MCS table 1, MCS table 2, and MCS table 3). For example, the terminal and the base station may understand that a value corresponding to the MCS value included in the SCI, which is greater than 27, i.e., an MCS value of 28, 29, 30, or 31, corresponds to retransmission when MCS table 2 is configured, and a value corresponding to the MCS value greater than 28, i.e., an MCS value of 29, 30, or 31, corresponds to retransmission when MCS table 1 or MCS table 3 is configured.

Fourth Embodiment

This embodiment relates to a method and a device for performing scheduling so that a maximum data rate (max data rate) of the terminal is not exceeded and receiving data, in performing data transmission or retransmission. Data in the disclosure may be interchangeably used with a TB, a transport block, or a transmission block.

When the terminal has accessed the base station, the capability of the terminal may be reported to the base station, and the capability of the terminal may include at least one of parameters which allow calculation of a maximum data rate of the terminal, such as a maximum number of layers supportable by the terminal and a maximum modulation order. In addition, the capability of the terminal may include whether TBoMS of the terminal is supported (a method such as "Yes/no", "Yes", or "N" (mapping of one TB to N slots)). The base station may perform scheduling for the terminal, based on the capability. When there is no parameter related to TBoMS support, it may be interpreted that the terminal does not support TBoMS. The maximum data rate of the terminal may be calculated based on the capability of the terminal, reported to the base station, and parameters configured for the terminal by the base station via RRC signaling, for example, as given in Mathematical expression 1 above. The maximum data rate of the terminal may be determined based on baseband processing or signal processing capabilities of the corresponding terminal, including channel estimation, equalization, channel code decoding, multi-antenna reception, etc. That is, when a maximum data rate of a terminal is high, it can be considered that a signal processing capability of the corresponding terminal is high. The terminal may calculate a maximum data rate for communication with the base station and a maximum data rate for communication with a terminal. Different values may be used for at least one parameter used when calculating the maximum data rate according to a communication counterpart. The parameter may include at least a parameter such as $OH^{(j)}$.

The terminal may receive downlink control information or sidelink control information including scheduling information, identify the scheduling information, and calculate the actual instant data rate by using at least one of the following methods from the identified scheduling information.

The terminal may identify a TBS value or the amount of data to be transmitted or received, from the scheduling information, and may also identify the number of slots and/or the number of symbols to which a PDSCH, a PUSCH, or a PSSCH is mapped.

When a data rate calculated based on the information scheduled for the terminal is greater than a maximum data rate of the terminal, the terminal may fail to complete signal processing required for the scheduled data transmission or reception within a given time. Accordingly, the base station may need to perform scheduling so that the maximum data rate of the corresponding terminal has a value smaller than that of the actual instant data rate. This is because when the actual instant data rate is scheduled to be greater than the maximum data rate of the terminal, the terminal fails to complete the signal processing within a given time, which causes inefficient use of frequency-time resources.

Accordingly, according to an embodiment, a scheduling and data transmission or reception method may vary according to a method for calculating the actual instant data rate. For example, a method for checking whether the actual instant data rate satisfies the capability of the terminal may be calculated based on, for example, Mathematical expression 2 above. The left side of the inequality sign in Mathematical expression 2 may indicate the scheduled instant data rate, and DataRateCC on the right side may indicate a maximum data rate in the corresponding serving cell of the terminal, determined according to the capability of the terminal. For DataRateCC on the right side, each corresponding value may be used according to whether the scheduling is scheduling for transmission or reception to or from the base station, such as a PDSCH or a PUSCH, or scheduling for transmission or reception to or from the terminal, such as a PSSCH.

FIG. 13 illustrates an example of determining a slot including a specific time point in a carrier configured for a terminal via higher layer signaling according to an embodiment of the disclosure.

Referring to FIG. 13, the length of a slot may vary for each carrier according to a subcarrier spacing, and marked slots are slots including a specific time point (Cases 1, 2, 3, 4, 5, and 6). As the specific time point changes, for example, from reference time A to reference time B, a slot including the corresponding specific time point may change, for example, from slots A1, A2, and A3 to slots B1, B2, and B3.

In an example of FIG. 13, slot A1 and slot B1 may be the same slot, and slot A2 and slot B2 may be the same slot. Accordingly, in calculating an actual average transmission rate of the terminal in reference time A, code blocks transmitted in a PDSCH, a PUSCH, or a PSSCH may be used in consideration of only the PDSCH, PUSCH, or PSSCH mapped to slots (that is, slots A1, A2, and A3) including reference time A corresponding to the corresponding specific time point, and transmitted.

When the reference time changes from D to reference time E, slots including the reference time may change from D1, D2, and D3 to E1, E2, and E3, and in this case, slots including the reference time are all changed. The terminal may calculate the actual transmission rate in consideration of only the PDSCH, PUSCH, or PSSCH mapped to slots (i.e., E1, E2, and E3) including reference time E, and transmitted, and may perform PDSCH reception, PUSCH transmission, and PSSCH transmission or reception in the corresponding slot only when the actual transmission rate is scheduled to have a value smaller than the maximum transmission rate of the terminal, calculated as in Mathematical expression 1. Alternatively, when the maximum transmission rate is greater than the calculated transmission rate, the terminal may skip the PDSCH reception, the PUSCH transmission, and the PSSCH transmission or reception in the corresponding slot. The slot including the reference time in the disclosure may be called an overlapped slot.

In the description above, Mathematical expression 4 may be a condition applied to all cases including initial transmission and retransmission, and Mathematical expression 2 may be a condition applied to a case of retransmission. However, Mathematical expression 2 or 4 is a mere example of a condition of scheduling constraint, and the disclosure is not limited thereto.

For all cases in which the base station performs scheduling of retransmission of a specific TB for the terminal, for example, when the scheduling is restricted so that the condition in Mathematical expression 2 is satisfied, many cases that retransmission cannot be scheduled may occur.

Here, when retransmission of a specific TB is scheduled for the terminal by the base station, it may mean a condition that the MCS is greater than 27 in a case where MCS table 2 below is configured, or a condition that the MCS is greater than 28 in a case where the MCS table other than MCS table 2 is configured.

In retransmission of the actual NR system, scheduling may be performed using all MCS values and data transmission or reception may be performed. When the retransmission is scheduled in this embodiment and the following embodiments, it may be interpreted in a case where scheduling is performed based on MCS table 2 that scheduling is performed using a value corresponding to the MCS value greater than 27, i.e., a MCS value of 28, 29, 30, or 31, but the disclosure is not limited thereto, and the disclosure may also be applied in the case of retransmission even though another MCS value is used.

In addition, when the retransmission is scheduled in this embodiment and the following embodiments, it may be interpreted that scheduling is performed using a value corresponding to the MCS value greater than 28, i.e., 29, 30, or 31, in a case other than MCS table 2 (Table 12), or in a case where scheduling is performed based on MCS table 1 (Table 11) or MCS table 2 (Table 13), but the disclosure is not limited thereto, and the disclosure may also be applied in the case of retransmission even though another MCS value is used.

TABLE 11

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 12

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |

TABLE 12-continued

| MCS Index $I_{MCS}$ | Modulation Order $Q_m$ | Target code Rate R × [1024] | Spectral efficiency |
|---|---|---|---|
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

TABLE 13

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

Alternatively, more specifically in the disclosure, a case where an IMCS value for at least one TB in DCI is greater than a specific value (W=27 or 28) may be assumed or considered to be retransmission. A specific value for comparison with the IMCS may be determined to be 27 or 28 according to a configuration on an MCS table to be used.

For example, the specific value W may be determined according to a high layer parameter mcs-Table value included in a configuration related to PDSCH transmission, PUSCH transmission, or SPS transmission, and for example, the specific value may be 27 in a case where configuration is made with "qam256", and 28 in the remaining cases.

For example, in a case where a 120 kHz subcarrier spacing is used, 2-layer transmission is performed in a 100

MHz frequency bandwidth, and transmission is performed with 64QAM, and the base station performs initial transmission of one TB over 7 symbols with MCS 26 to the terminal by using a PDSCH, the base station may fail to perform retransmission over the same 7 symbols. This is because a specific terminal cannot process scheduling against the condition of Mathematical expression 2.

Accordingly, when retransmission is performed, a case where a scheduling constraint condition (for example, Mathematical expression 2) is considered in determining subsequence operations by the base station and the terminal may be limited to specific cases. Hereinafter, as an example of the scheduling constraint condition, Mathematical expression 2 is described, but the disclosure is not limited thereto.

For example, the scheduling constraint condition may be limited to be applied only when the number L of symbols assigned to PDSCH transmission of retransmission is less than 7 This may be a method of considering a condition given as Mathematical expression 2 above only in a case where retransmission is performed, a case where an IMCS value for at least one TB in DCI is greater than a specific value (W=27 or 28), or a case where a PDSCH is mapped to the number of symbols, which is less than 7 symbols, and transmitted. That is, when the number L of symbols to which the PDSCH used for retransmission is mapped is greater than or equal to 7, the condition of Mathematical expression 2 is not applied.

In this embodiment and the following embodiments, when the number of symbols used for PDSCH mapping, the number of symbols assigned to PDSCH transmission, or the number of symbols used for PDSCH transmission is determined, a demodulation reference signal (DMRS) symbol for the PDSCH may also be included in a symbol used for PDSCH transmission. That is, DCI indicating the PDSCH mapping information and configuration information related to symbols for PDSCH transmission transferred via higher layer signaling may be all considered to determine the number of symbols. Similarly, in a case of the PUSCH, a symbol used for PUSCH transmission may be determined to include a DMRS symbol for the PUSCH.

In the description above, the reason that the condition of Mathematical expression 2 is considered only in the case where the PDSCH is mapped to the symbols less than 7 symbols is because the frequency of scheduling that data transmitted in the initial transmission is mapped to symbols, the number of which is less than 7 symbols, is low, and there are many cases that the data is mapped to symbols, the number of which is equal to or greater than 7 symbols. According to such easing of the condition, the complexity in a base station scheduling algorithm and implementation method can be reduced.

In this embodiment, a method for comparing the number L of symbols to which the PDSCH used for retransmission is mapped with 7 symbols and applying the same is described as an example, but the method is merely provided as an example, and this embodiment is not limited thereto. That is, this embodiment is not limited to 7 symbols, and may be extended to a method for performing comparison with reference to different numbers of symbols, such as 8 symbols or 9 symbols, and applied.

In addition to the embodiment in which the scheduling constraint condition (Mathematical expression 2) is applied based on whether the retransmission is performed and the number of symbols of the PDSCH, Mathematical expression 2 may be a condition applied in other cases. For example, when the terminal reports the capability of prompt processing time, when a higher parameter of Capability2-PDSCH- Processing is configured, or when processingType2Enabled is configured as (set to) "TRUE" in a higher parameter set of PDSCH-ServingCellConfig (or PUSCH-ServingCellConfig), Mathematical expression 2 may also be applied. In the description above, applying Mathematical expression 2 may include checking the condition of Mathematical expression 2, and performing transmission or reception of data, based on scheduling, only when the scheduling satisfied Mathematical expression 2.

Fifth Embodiment

This embodiment relates to another method and a device for performing scheduling without exceeding a maximum data rate (max data rate) of a terminal, and receiving data, in performing data transmission or retransmission.

When the terminal has accessed the base station, the capability of the terminal may be reported to the base station, and the capability of the terminal may include at least one of parameters which allow calculation of a maximum data rate of the terminal, such as a maximum number of layers supportable by the terminal and a maximum modulation order. In addition, the capability of the terminal may include whether TBoMS of the terminal is supported (a method such as "Yes/no", "Yes", or "N" (mapping of one TB to N slots)). The base station may perform scheduling for the terminal, based on the capability. When there is no parameter related to TBoMS support, it may be interpreted that the terminal does not support TBoMS.

The maximum data rate of the terminal may be calculated based on the capability of the terminal, reported to the base station, and parameters configured for the terminal by the base station via RRC signaling, for example, as given in Mathematical expression 1 above. The maximum data rate of the terminal may be determined based on baseband processing or signal processing capabilities of the corresponding terminal, including channel estimation, equalization, channel code decoding, multi-antenna reception, etc. That is, when a maximum data rate of a terminal is high, it can be considered that a signal processing capability of the corresponding terminal is high. The terminal may calculate a maximum data rate for communication with the base station and a maximum data rate for communication with a terminal. Different values may be used for at least one parameter used when calculating the maximum data rate according to a communication counterpart. The parameter may include at least a parameter such as $OH^{(j)}$.

The terminal may receive downlink control information or sidelink control information including scheduling information, identify the scheduling information, and calculate the actual instant data rate by using at least one of the following methods from the identified scheduling information.

The terminal may identify a TBS value or the amount of data to be transmitted or received, from the scheduling information, and may also identify the number of slots and/or the number of symbols to which a PDSCH, a PUSCH, or a PSSCH is mapped.

When an actual data rate calculated based on the information scheduled for the terminal is greater than a maximum data rate of the terminal, the terminal may fail to complete signal processing required for the scheduled data transmission or reception within a given time. Accordingly, the base station may need to perform scheduling so that the maximum data rate of the corresponding terminal has a value smaller than that of the actual instant data rate. This is because when the actual instant data rate is scheduled to be greater than the maximum data rate of the terminal, the terminal fails to complete the signal processing within a given time, which causes inefficient use of frequency-time resources.

Accordingly, according to an embodiment of the disclosure, a scheduling and data transmission or reception method may vary according to a method for calculating the actual instant data rate. For example, a method for checking whether the actual instant data rate satisfies the capability of the terminal may be calculated based on, for example, Mathematical expression 2 above. The left side of the inequality sign in Mathematical expression 2 may indicate the scheduled instant data rate, and DataRateCC on the right side may indicate a maximum data rate in the corresponding serving cell of the terminal, determined according to the capability of the terminal. For DataRateCC on the right side, each corresponding value may be used according to whether the scheduling is scheduling for transmission or reception to or from the base station, such as a PDSCH or a PUSCH, or scheduling for transmission or reception to or from the terminal, such as a PSSCH.

For example, another method for identifying whether the actual instant data rate satisfies the capability of the terminal may be calculated based on Mathematical expression 4 above. In Mathematical expression 4 above, the left side of the inequality sign may mean an instant data rate transmitted in J serving cells at the moment of the scheduling, and DataRate on the right side may mean a maximum data rate in J serving cells configured for the terminal according to the capability of the terminal. For DataRate on the right side, each corresponding value may be used according to whether the scheduling corresponds to scheduling for transmission or reception to or from the base station, such as the PDSCH or the PUSCH, or corresponds to scheduling for transmission or reception to or from the terminal, such as the PSSCH. Slot s_j corresponds to a slot in serving cell j overlapping with a specific time point at which the instant data rate is to be calculated, or including the specific time point.

In the description above, Mathematical expression 4 may be a condition applied to all cases including initial transmission and retransmission, and Mathematical expression 2 may be a condition applied to a case of retransmission. However, Mathematical expression 2 or 4 is a mere example of a condition of scheduling constraint, and the disclosure is not limited thereto.

For all cases in which the base station performs scheduling of retransmission of a specific TB for the terminal, for example, when the scheduling is restricted so that the condition in Mathematical expression 2 is satisfied, many cases that retransmission cannot be scheduled may occur. In the description above, when retransmission of a specific TB is scheduled for the terminal by the base station or the terminal, it may mean a condition that the MCS indicated by an indicator included in DCI or SCI is greater than 27 in a case where MCS table 2 below is configured, or a condition that the MCS is greater than 28 in a case where the MCS table other than MCS table 2 is configured. Detailed contents are identical to the description made above.

Alternatively, more specifically in the disclosure, a case where an IMCS value for at least one TB in DCI or SCI is greater than a specific value (W=27 or 28) may be assumed or considered to be retransmission. A specific value for comparison with the IMCS may be determined to be 27 or 28 according to a configuration on an MCS table to be used.

For example, the specific value W may be determined according to a high layer parameter mcs-Table value or mcs-Table-SL value included in a configuration related to PDSCH transmission, PUSCH transmission, PSSCH transmission or reception, or SPS transmission, and for example, the specific value may be 27 in a case where configuration is made with "qam256", and 28 in the remaining cases.

This may vary according to a table used when scheduling for data transmission is determined, among MCS table 1 (Table 11), MCS table 2 (Table 12), and MCS table 3 (Table 13).

For example, in a case where a 120 kHz subcarrier spacing is used, 2-layer transmission is performed in a 100 MHz frequency bandwidth, and transmission is performed with 64QAM, and the base station or the terminal performs initial transmission of one TB over 7 symbols with MCS 26 to the terminal by using a PDSCH, the base station or the terminal may fail to perform retransmission over the same 7 symbols. This is because a specific terminal cannot process scheduling against the condition of Mathematical expression 2.

Accordingly, when retransmission is performed, a case where a scheduling constraint condition (for example, Mathematical expression 2) is considered in determining subsequence operations by the base station and the terminal may be limited to specific cases. Hereinafter, as an example of the scheduling constraint condition, Mathematical expression 2 is described, but the disclosure is not limited thereto.

For example, when retransmission of a specific TB is scheduled, a method for applying the condition of Mathematical expression 2 only when the number L of symbols to which the PDSCH or the PSSCH used for retransmission is mapped is smaller than the number L' of symbols to which the PDSCH or the PSSCH used for the initial transmission is mapped may be used. That is, when the number L of symbols to which the PDSCH or the PSSCH used for the retransmission is mapped is equal to or greater than the number L' of symbols to which the PDSCH or the PSSCH used for the initial transmission is mapped, the condition of Mathematical expression 2 may not be applied.

In this embodiment and the following embodiments, when the number of symbols used for PDSCH or PSSCH mapping is determined, a demodulation reference signal (DMRS) symbol for the PDSCH or the PSSCH may also be included in a symbol used for PDSCH or PSSCH transmission. That is, DCI or SCI indicating the PDSCH or PSSCH mapping information or symbols used for PDSCH or PSSCH transmission, transferred via higher layer signaling, may be all considered to determine the number of symbols. Similarly, in a case of the PUSCH, a symbol used for PUSCH transmission may be determined to include a DMRS symbol for the PUSCH.

In a case where the retransmission is performed or a case where an IMCS value for at least one TB in the DCI or the SCI is greater than a specific value (W=27 or 28), the scheduling constraint condition given as Mathematical expression 2 may be considered only when the PDSCH or the PSSCH for the retransmission is mapped to symbols, the number of which is smaller than the number of symbols to which the PDSCH or the PSSCH used for the initial transmission, and transmitted. This is because, in many cases, the complexity in a base station scheduling algorithm and implementation method can be reduced when the base station performs transmission by using the same number of symbols for both the initial transmission and the retransmission.

In addition to the embodiment in which the scheduling constraint condition (i.e., Mathematical expression 2) is applied based on whether the retransmission is performed and the number of symbols of the PDSCH or the PSSCH, Mathematical expression 2 may be a condition applied in other cases. For example, when the terminal reports the capability of prompt processing time, when a higher parameter of Capability2-PDSCH-Processing is configured, or when processingType2Enabled is configured as (set to) "TRUE" in a higher parameter set of PDSCH-ServingCell-Config (or PUS CH-ServingCellConfig), Mathematical expression 2 may also be applied. In the description above, applying Mathematical expression 2 may include checking the condition of Mathematical expression 2, and performing transmission or reception of data, based on scheduling, only when the scheduling satisfied Mathematical expression 2.

Sixth Embodiment

This embodiment relates to another method and a device for performing scheduling without exceeding a maximum data rate (max data rate) of a terminal, and receiving data, in performing data transmission or retransmission.

When the terminal has accessed the base station, the capability of the terminal may be reported to the base station, and the capability of the terminal may include at least one of parameters which allow calculation of a maximum data rate of the terminal, such as a maximum number of layers supportable by the terminal and a maximum modulation order. In addition, the capability of the terminal may include whether TBoMS of the terminal is supported (a method such as "Yes/no", "Yes", or "N" (mapping of one TB to N slots)). The base station may perform scheduling for the terminal, based on the capability. When there is no parameter related to TBoMS support, it may be interpreted that the terminal does not support TBoMS.

The maximum data rate of the terminal may be calculated based on the capability of the terminal, reported to the base station, and parameters configured for the terminal by the base station via RRC signaling, for example, as given in Mathematical expression 1 above. The maximum data rate of the terminal may be determined based on baseband processing or signal processing capabilities of the corresponding terminal, including channel estimation, equalization, channel code decoding, multi-antenna reception, etc. That is, when a maximum data rate of a terminal is high, it can be considered that a signal processing capability of the corresponding terminal is high. The terminal may calculate a maximum data rate for communication with the base station and a maximum data rate for communication with a terminal. Different values may be used for at least one parameter used when calculating the maximum data rate according to a communication counterpart. The parameter may include at least a parameter such as $OH^{(j)}$.

The terminal may receive downlink control information or sidelink control information including scheduling information, identify the scheduling information, and calculate the actual instant data rate by using at least one of the following methods from the identified scheduling information.

The terminal may identify a TBS value or the amount of data to be transmitted or received, from the scheduling information, and may also identify the number of slots and/or the number of symbols to which a PDSCH, a PUSCH, or a PSSCH is mapped.

When an actual data rate calculated based on the information scheduled for the terminal is greater than a maximum data rate of the terminal, the terminal may fail to complete signal processing required for the scheduled data transmission or reception within a given time. Accordingly, the base station may need to perform scheduling so that the maximum data rate of the corresponding terminal has a value smaller than that of the actual instant data rate. This is because when the actual instant data rate is scheduled to be greater than the maximum data rate of the terminal, the terminal fails to complete the signal processing within a given time, which causes inefficient use of frequency-time resources.

Accordingly, according to an embodiment of the disclosure, a scheduling and data transmission or reception method may vary according to a method for calculating the actual instant data rate. For example, a method for checking whether the actual instant data rate satisfies the capability of the terminal may be calculated based on, for example, Mathematical expression 2 above. The left side of the inequality sign in Mathematical expression 2 may indicate the scheduled instant data rate, and DataRateCC on the right side may indicate a maximum data rate in the corresponding serving cell of the terminal, determined according to the capability of the terminal. For DataRateCC on the right side, each corresponding value may be used according to whether the scheduling is scheduling for transmission or reception to or from the base station, such as a PDSCH or a PUSCH, or scheduling for transmission or reception to or from the terminal, such as a PSSCH.

For example, another method for checking whether the actual instant data rate satisfies the capability of the terminal may be calculated based on Mathematical expression 4 above. In Mathematical expression 4 above, the left side of the inequality sign may mean an instant data rate transmitted in J serving cells at the moment of the scheduling, and DataRate on the right side may mean a maximum data rate in J serving cells configured for the terminal according to the capability of the terminal. For DataRate on the right side, each corresponding value may be used according to whether the scheduling corresponds to scheduling for transmission or reception to or from the base station, such as the PDSCH or the PUSCH, or corresponds to scheduling for transmission or reception to or from the terminal, such as the PSSCH. Slot s_j corresponds to a slot in serving cell j overlapping with a specific time point at which the instant data rate is to be calculated, or including the specific time point.

In the description above, Mathematical expression 4 may be a condition applied to all cases including initial transmission and retransmission, and Mathematical expression 2 may be a condition applied to a case of retransmission. However, Mathematical expression 2 or 4 is a mere example of a condition of scheduling constraint, and the disclosure is not limited thereto.

For all cases in which the base station performs scheduling of retransmission of a specific TB for the terminal, for example, when the scheduling is restricted so that the condition in Mathematical expression 2 is satisfied, many cases that retransmission cannot be scheduled may occur. In the description above, when retransmission of a specific TB is scheduled for the terminal by the base station or the terminal, it may mean a condition that the MCS indicated by an indicator included in DCI or SCI is greater than 27 in a case where MCS table 2 below is configured, or a condition that the MCS is greater than 28 in a case where the MCS table other than MCS table 2 is configured. Detailed contents are identical to the description made above.

Alternatively, more specifically in the disclosure, a case where an IMCS value for at least one TB in DCI or SCI is greater than a specific value (W=27 or 28) may be assumed or considered to be retransmission. A specific value for comparison with the IMCS may be determined to be 27 or 28 according to a configuration on an MCS table to be used.

For example, the specific value W may be determined according to a high layer parameter mcs-Table value or mcs-Table-SL value included in a configuration related to PDSCH transmission, PUSCH transmission, PSSCH transmission or reception, or SPS transmission, and for example, the specific value may be 27 in a case where configuration is made with "qam256", and 28 in the remaining cases.

This may vary according to a table used when scheduling for data transmission is determined, among MCS table 1 (Table 11), MCS table 2 (Table 12), and MCS table 3 (Table 13).

For example, in a case where a 120 kHz subcarrier spacing is used, 2-layer transmission is performed in a 100 MHz frequency bandwidth, and transmission is performed with 64QAM, and the base station or the terminal performs initial transmission of one TB over 7 symbols with MCS 26 to the terminal by using a PDSCH, the base station or the terminal may fail to perform retransmission over the same 7 symbols. This is because a specific terminal cannot process scheduling against the condition of Mathematical expression 2.

Accordingly, when retransmission is performed, a case where a scheduling constraint condition (for example, Mathematical expression 2) is considered in determining subsequence operations by the base station and the terminal may be limited to specific cases. Hereinafter, as an example of the scheduling constraint condition, Mathematical expression 2 is described, but the disclosure is not limited thereto.

For example, when retransmission of a specific TB is scheduled, a method for applying the condition of Mathematical expression 2 only when the number L of symbols to which the PDSCH or the PSSCH used for retransmission is mapped is smaller than the number L' of symbols to which the PDSCH or the PSSCH used for the initial transmission is mapped may be used. That is, when the number L of symbols to which the PDSCH or the PSSCH used for the retransmission is mapped is equal to or greater than the number L' of symbols to which the PDSCH or the PSSCH used for the initial transmission is mapped, or the number L of symbols to which the PDSCH or the PSSCH used for the retransmission is mapped is equal to or greater than 7 symbols, the condition of Mathematical expression 2 may not be applied.

In another example, when retransmission of a specific TB is scheduled, a method for applying the condition of Mathematical expression 2 only when the number L of symbols to the PDSCH or the PSSCH used for retransmission is mapped even is smaller than a smaller value between 7 and the number L' of symbols to which the PDSCH or the PSSCH used for initial transmission is mapped. That is, the condition of Mathematical expression 2 is applied only when the number L of symbols to which the PDSCH or the PSSCH used for retransmission is mapped is smaller than $\min(L', 7)$.

In this embodiment and the following embodiments, when the number of symbols used for PDSCH or PSSCH mapping is determined, a demodulation reference signal (DMRS) symbol for the PDSCH or the PSSCH may also be included in a symbol used for PDSCH or PSSCH mapping. That is, DCI or SCI indicating the PDSCH or PSSCH mapping information or symbols used for PDSCH or PSSCH transmission, transferred via higher layer signaling, may be all considered to determine the number of symbols. Similarly, in a case of the PUSCH, a symbol used for PUSCH transmission may be determined to include a DMRS symbol for the PUSCH.

In a case where the retransmission is performed or a case where an IMCS value for at least one TB in the DCI or the SCI is greater than a specific value (W=27 or 28), the scheduling constraint condition given as Mathematical expression 2 may be considered only when the PDSCH or the PSSCH for the retransmission is mapped to symbols, the number of which is smaller than the number of symbols to which the PDSCH or the PSSCH used for the initial transmission, and transmitted. This is based on that, in many cases, the base station performs transmission by using the same number of symbols for both the initial transmission and the retransmission and there are many cases where scheduling with a large TBS is performed when the number of symbols is greater than 7 symbols, and according thereto, the complexity in a base station scheduling algorithm and implementation method can be reduced.

In addition to the embodiment in which the scheduling constraint condition (i.e., Mathematical expression 2) is applied based on whether the retransmission is performed and the number of symbols of the PDSCH or the PSSCH, Mathematical expression 2 may be a condition applied in other cases. For example, when the terminal reports the capability of prompt processing time, when a higher parameter of Capability2-PDSCH-Processing is configured, or when processingType2Enabled is configured as (set to) "TRUE" in a higher parameter set of PDSCH-ServingCell-Config (or PUSCH-ServingCellConfig), Mathematical expression 2 may also be applied. In the description above, applying Mathematical expression 2 may include checking the condition of Mathematical expression 2, and performing transmission or reception of data, based on scheduling, only when the scheduling satisfied Mathematical expression 2.

Seventh Embodiment

This embodiment relates to another method and a device for performing scheduling without exceeding a maximum data rate (max data rate) of a terminal, and receiving data, in performing data transmission or retransmission.

When the terminal has accessed the base station, the capability of the terminal may be reported to the base station, and the capability of the terminal may include at least one of parameters which allow calculation of a maximum data rate of the terminal, such as a maximum number of layers supportable by the terminal and a maximum modulation order. In addition, the capability of the terminal may include whether TBoMS of the terminal is supported (a method such as "Yes/no", "Yes", or "N" (mapping of one TB to N slots)). The base station may perform scheduling for the terminal, based on the capability. When there is no parameter related to TBoMS support, it may be interpreted that the terminal does not support TBoMS.

The maximum data rate of the terminal may be calculated based on the capability of the terminal, reported to the base station, and parameters configured for the terminal by the base station via RRC signaling, for example, as given in Mathematical expression 1 above. The maximum data rate of the terminal may be determined based on baseband processing or signal processing capabilities of the corresponding terminal, including channel estimation, equalization, channel code decoding, multi-antenna reception, etc. That is, when a maximum data rate of a terminal is high, it can be considered that a signal processing capability of the corresponding terminal is high. The terminal may calculate a maximum data rate for communication with the base station and a maximum data rate for communication with a terminal. Different values may be used for at least one parameter used when calculating the maximum data rate according to a communication counterpart. The parameter may include at least a parameter such as $OH^{(j)}$.

The terminal may receive downlink control information or sidelink control information including scheduling information, identify the scheduling information, and calculate the actual instant data rate by using at least one of the following methods from the identified scheduling information.

The terminal may identify a TBS value or the amount of data to be transmitted or received, from the scheduling information, and may also identify the number of slots and/or the number of symbols to which a PDSCH, a PUSCH, or a PSSCH is mapped.

When an actual data rate calculated based on the information scheduled for the terminal is greater than a maximum data rate of the terminal, the terminal may fail to complete signal processing required for the scheduled data transmission or reception within a given time. Accordingly, the base station may need to perform scheduling so that the maximum data rate of the corresponding terminal has a value smaller than that of the actual instant data rate. This is because when the actual instant data rate is scheduled to be greater than the maximum data rate of the terminal, the terminal fails to complete the signal processing within a given time, which causes inefficient use of frequency-time resources.

Accordingly, according to an embodiment of the disclosure, a scheduling and data transmission or reception method may vary according to a method for calculating the actual instant data rate. For example, a method for checking whether the actual instant data rate satisfies the capability of the terminal may be calculated based on, for example, Mathematical expression 2 above. The left side of the inequality sign in Mathematical expression 2 may indicate the scheduled instant data rate, and DataRateCC on the right side may indicate a maximum data rate in the corresponding serving cell of the terminal, determined according to the capability of the terminal. For DataRateCC on the right side, each corresponding value may be used according to whether the scheduling is scheduling for transmission or reception to or from the base station, such as a PDSCH or a PUSCH, or scheduling for transmission or reception to or from the terminal, such as a PSSCH.

For example, another method for checking whether the actual instant data rate satisfies the capability of the terminal may be calculated based on Mathematical expression 4 above. In Mathematical expression 4 above, the left side of the inequality sign may mean an instant data rate transmitted in J serving cells at the moment of the scheduling, and DataRate on the right side may mean a maximum data rate in J serving cells configured for the terminal according to the capability of the terminal. For DataRate on the right side, each corresponding value may be used according to whether the scheduling corresponds to scheduling for transmission or reception to or from the base station, such as the PDSCH or the PUSCH, or corresponds to scheduling for transmission or reception to or from the terminal, such as the PSSCH. Slot s_j corresponds to a slot in serving cell j overlapping with a specific time point at which the instant data rate is to be calculated, or including the specific time point.

In the description above, Mathematical expression 4 may be a condition applied to all cases including initial transmission and retransmission, and Mathematical expression 2 may be a condition applied to a case of retransmission.

However, Mathematical expression 2 or 4 is a mere example of a condition of scheduling constraint, and the disclosure is not limited thereto.

For all cases in which the base station or the terminal performs scheduling of retransmission of a specific TB for the terminal, for example, when the scheduling is restricted so that the condition in Mathematical expression 2 is satisfied, many cases that retransmission cannot be scheduled may occur. In the description above, when retransmission of a specific TB is scheduled for the terminal by the base station or the terminal, it may mean a condition that the MCS indicated by an indicator included in DCI or SCI is greater than 27 in a case where MCS table 2 below is configured, or a condition that the MCS is greater than 28 in a case where the MCS table other than MCS table 2 is configured. Detailed contents are identical to the description made above.

Alternatively, more specifically in the disclosure, a case where an IMCS value for at least one TB in DCI or SCI is greater than a specific value (W=27 or 28) may be assumed or considered to be retransmission. A specific value for comparison with the IMCS may be determined to be 27 or 28 according to a configuration on an MCS table to be used.

For example, the specific value W may be determined according to a high layer parameter mcs-Table value or mcs-Table-SL value included in a configuration related to PDSCH transmission, PUSCH transmission, PSSCH transmission or reception, or SPS transmission, and for example, the specific value may be 27 in a case where configuration is made with "qam256", and 28 in the remaining cases.

This may vary according to a table used when scheduling for data transmission is determined, among MCS table 1 (Table 11), MCS table 2 (Table 12), and MCS table 3 (Table 13). For example, in a case where a 120 kHz subcarrier spacing is used, 2-layer transmission is performed in a 100 MHz frequency bandwidth, and transmission is performed with 64QAM, and the base station or the terminal performs initial transmission of one TB over 7 symbols with MCS 26 to the terminal by using a PDSCH, the base station or the terminal may fail to perform retransmission over the same 7 symbols. This is because a specific terminal cannot process scheduling against the condition of Mathematical expression 2.

Accordingly, when retransmission is performed, a case where a scheduling constraint condition (for example, Mathematical expression 2) is considered in determining subsequence operations by the base station and the terminal may be limited to specific cases. Hereinafter, as an example of the scheduling constraint condition, Mathematical expression 2 is described, but the disclosure is not limited thereto.

For example, when retransmission of a specific TB is scheduled, a method for applying the condition of Mathematical expression 2 only when, for the number L' of symbols to which the PDSCH or the PSSCH used for the initial transmission, the number L of symbols to which the PDSCH or the PSSCH used for retransmission is mapped is smaller than L'−x symbols may be used. That is, when the number L of symbols to which the PDSCH or the PSSCH used for the retransmission is mapped is equal to or greater than the number L'−x of symbols to which the PDSCH or the PSSCH used for the initial transmission is mapped, the condition of Mathematical expression 2 may not be applied.

In the description above, a value of x may be applied as a fixed value such as 2 or 3, but may be a value separately configured by the base station via higher layer signaling. For example, when the value of x is configured or predetermined to be 2, for the number L' of symbols to which the PDSCH or the PSSCH used for initial transmission is mapped, the condition of Mathematical expression 2 may be applied when the number L of symbols to which the PDSCH or the PSSCH used for retransmission is mapped is smaller than L'−2.

In this embodiment and the following embodiments, when the number of symbols used for PDSCH or PSSCH mapping is determined, a demodulation reference signal (DMRS) symbol for the PDSCH or the PSS CH may also be included in counting the number of symbols used for PDSCH or PSSCH mapping. That is, DCI or SCI indicating the PDSCH or PSSCH mapping information or symbols used for PDSCH or PSSCH transmission, transferred via higher layer signaling, may be all considered to determine the number of symbols. Similarly, in a case of the PUSCH, a symbol used for PUSCH transmission may be determined to include a DMRS symbol for the PUSCH.

In a case where the retransmission is performed or a case where an IMCS value for at least one TB in the DCI or the SCI is greater than a specific value (W=27 or 28), the scheduling constraint condition given as Mathematical expression 2 may be considered only when the PDSCH or the PSSCH for the retransmission is mapped to symbols, the number of which is smaller than the number of symbols to which the PDSCH or the PSSCH used for the initial transmission, and transmitted. This is based on that, in many cases, the base station performs transmission by using the same number of symbols for both the initial transmission and the retransmission or by using about 2 symbols less for retransmission than those for initial transmission, and according thereto, the complexity in a base station scheduling algorithm and implementation method can be reduced.

In addition to the embodiment in which the scheduling constraint condition (i.e., Mathematical expression 2) is applied based on whether the retransmission is performed and the number of symbols of the PDSCH or the PSSCH, Mathematical expression 2 may be a condition applied in other cases. For example, when the terminal reports the capability of prompt processing time, when a higher parameter of Capability2-PDSCH-Processing is configured, or when processingType2Enabled is configured as (set to) "TRUE" in a higher parameter set of PDSCH-ServingCell-Config (or PUS CH-ServingCellConfig), Mathematical expression 2 may also be applied. In the description above, applying Mathematical expression 2 may include checking the condition of Mathematical expression 2, and performing transmission or reception of data, based on scheduling, only when the scheduling satisfied Mathematical expression 2.

Hereinafter, an operation of a terminal according to this embodiment is described.

The terminal may identify a condition for determining a subsequence operation method through DCI or SCI transferred through a PDCCH.

According to an embodiment, a result of the identifying the DCI or SCI shows initial transmission, the terminal may utilize a condition of Mathematical expression 5 below to determine the subsequence operation method.

$$\sum_{j=0}^{J-1} \frac{\sum_{m=0}^{M-1} V_{j,m}}{T_{slot}^{\mu(j)}} \le DataRate \qquad \text{Mathematical expression 5}$$

According to an embodiment, the terminal may utilize an instant data rate condition of Mathematical expression 2 to determine the subsequent operation method when an IMCS value for at least one TB in the DCI or SCI is greater than a specific value (W=27 or 28). In the disclosure, the instant data rate condition may be used same as the above-described scheduling constraint condition.

In the above and following embodiments, a specific value for comparison with the IMCS may be determined as 27 or 28 according to a configuration on an MCS Table to be used. For example, the specific value may be determined according to a high layer parameter mcs-Table value or mcs-Table-SL value included in a configuration related to PDSCH transmission, PUSCH transmission, PSSCH transmission or reception, or SPS transmission, and for example, the specific value may be 27 in a case where configuration is made with "qam256", and 28 in the remaining cases.

For a reception terminal, J may denote a total number of PSSCHs received in one slot by the reception terminal.

In sidelink communication, the reception terminal may select J to satisfy Mathematical expression 5, and in this case, may sequentially select J PSSCHs having high levels of QoS, that is, in the sequence of the priorities, from among all received PSSCHs. When the PSSCHs have the same level of QoS, the reception terminal may randomly select PSSCHs. Alternatively, in selecting J PSSCHs, the terminal may determine J PSSCHs in an ascending order of a PRB index.

According to an embodiment, whether to utilize the instant data rate condition of Mathematical expression 2 may be determined according to the length of the number L of symbols for a retransmission PDSCH or a retransmission PUSCH or PSSCH scheduled by DCI or SCI, and/or according to a result of comparison between the number L of symbols and/or the number n of slots for the retransmission PDSCH or the retransmission PUS CH or PSSCH and the number L' of symbols and/or the number n' of slots for an initial transmission PDSCH or an initial transmission PUSCH or PSSCH. For example, the terminal may operate according to the embodiments described below.

According to an embodiment, the terminal may utilize the instant data rate condition of Mathematical expression 2 to determine the subsequent operation method when the number L of symbols for the retransmission PDSCH or PSSCH scheduled by the DCI or SCI is smaller than a specific number (e.g., L<7) and an IMCS value for at least one TB in the DCI or SCI is greater than a specific value (W=27 or 28). The terminal may perform the scheduled PDSCH reception or PSSCH transmission or reception without identifying whether the instant data rate condition of Mathematical expression 2 is satisfied when the number L of symbols for the transmission PDSCH or PSSCH is equal to or greater than a specific number (e.g., L>=7), or an IMCS value for at least one TB in the DCI or SCI is greater than a specific value (W=27 or 28).

According to an embodiment, the terminal may utilize the instant data rate condition of Mathematical expression 2 to determine the subsequent operation method when the number L of symbols for the retransmission PDSCH or PSSCH scheduled by the DCI or SCI is smaller than the number L' of symbols for the initial PDSCH or PSSCH (i.e., L<L') and an IMCS value for at least one TB in the DCI or SCI is greater than a specific value (W=27 or 28). The terminal may perform the scheduled PDSCH reception or PSSCH transmission or reception without identifying whether the instant data rate condition of Mathematical expression 2 is satisfied when the number L of symbols for the retransmission PDSCH or PSSCH is equal to or greater than the number L' of symbols for the initial PDSCH or PSSCH (i.e., L>=L')

and an IMCS value for at least one TB in the DCI or SCI is greater than a specific value (W=27 or 28).

According to an embodiment, the terminal may utilize the instant data rate condition of Mathematical expression 2 to determine the subsequent operation method when the number L of symbols for the retransmission PDSCH or PSSCH scheduled by the DCI or SCI is smaller than the number L' of symbols for the initial PDSCH or PSSCH and a specific value (e.g., 7) (i.e., L<7 and L<L') and an IMCS value for at least one TB in the DCI is greater than a specific value (W=27 or 28). The terminal may perform the scheduled PDSCH reception or PSSCH transmission or reception without identifying whether the instant data rate condition of Mathematical expression 2 is satisfied when the number L of symbols for the retransmission PDSCH or PSSCH is equal to or greater than an initial specific number, or is equal to or greater than the number L' of symbols for the initial PDSCH or PSSCH (i.e., L>=7 or L>=L') and an IMCS value for at least one TB in the DCI or SCI is greater than a specific value (W=27 or 28).

According to an embodiment, the terminal may utilize the instant data rate condition of Mathematical expression 2 to determine the subsequent operation method when the number L of symbols for the retransmission PDSCH or PSSCH scheduled by the DCI or SCI is smaller than a minimum value between the number L' of symbols for the initial PDSCH or PSSCH and a specific value (e.g., 7) (i.e., L<min(7, L')) and an IMCS value for at least one TB in the DCI is greater than a specific value (W=27 or 28). The terminal may perform the scheduled PDSCH reception or PSSCH transmission or reception without identifying whether the instant data rate condition of Mathematical expression 2 is satisfied when the number L of symbols for the retransmission PDSCH or PSSCH is equal to or greater than a minimum value between the specific number (e.g., 7) and the number L' of symbols for the initial PDSCH or PSSCH (i.e., L>=min(7, L')) and an IMCS value for at least one TB in the DCI or SCI is greater than a specific value (W=27 or 28).

According to an embodiment, the terminal may utilize the instant data rate condition of Mathematical expression 2 to determine the subsequent operation method when the number L of symbols for the retransmission PDSCH or PSSCH scheduled by the DCI or SCI is smaller than a difference between the number L' of symbols for the initial PDSCH or PSSCH and a specific symbol number x (i.e., L<L'-x) and an IMCS value for at least one TB in the DCI is greater than a specific value (W=27 or 28). The terminal may perform the scheduled PDSCH reception or PSSCH transmission or reception without identifying whether the instant data rate condition of Mathematical expression 2 is satisfied when the number L of symbols for the retransmission PDSCH or PSSCH is equal to or greater than a difference between the symbol number x and the number L' of symbols for the initial PDSCH or PSSCH (i.e., L>=L'-x) and an IMCS value for at least one TB in the DCI or SCI is greater than a specific value (W=27 or 28). Here, the value x may be a fixed value such as 2 or 3. Alternatively, the value of x may be a value separately configured by the base station via higher layer signaling.

According to an embodiment, in determining the number L of the retransmission PDSCH or PSSCH scheduled by the DCI or SCI, the terminal may determine the number by including punctured symbols.

Alternatively, according to an embodiment, in determining the number L of symbols for the retransmission PDSCH or PSSCH scheduled by the DCI or SCI, the terminal may determine the number by excluding punctured symbols.

The above-described embodiments may be applied in the same manner as in a case of a PUSCH.

In addition, the above-described embodiments may be applied in the same manner as in a case of a PDSCH, a PUSCH, and a PSSCH scheduled so that one TB is mapped to multiple slots.

Eighth Embodiment

FIG. 14 illustrates a terminal operation for downlink reception, uplink transmission, or sidelink transmission or reception according to an embodiment of the disclosure.

Referring to FIG. 14, a terminal may perform monitoring of a PDCCH (or PSCCH) in a determined resource or a configured resource (operation 1410).

The terminal may decode DCI (or SCI transferred from another terminal through the PSCCH) transferred from the base station through the PDCCH, and identify whether it is necessary to identify whether an instant data rate condition is satisfied. If it is necessary to identify whether the instant data rate condition is satisfied, the terminal may identify whether a PDSCH, a PUSCH, or a PSSCH scheduled by the corresponding DCI (or SCI) satisfies the instant data rate condition described in the above-described embodiments (operation 1420).

If the instant data rate condition is satisfied, the terminal may perform the scheduled PDSCH reception, PUSCH transmission, or PSSCH transmission or reception (operation 1430).

If the instant data rate condition is not satisfied, the terminal may not perform the scheduled PDSCH reception, PUSCH transmission, or PSSCH transmission or reception (operation 1440). The terminal may stop buffering of the PDSCH or the PSSCH, or may not perform the buffering of the PDSCH or the PSSCH. Although not shown in FIG. 14, if the instant data rate condition is not satisfied, the terminal for transmitting the PUSCH or the PSSCH may stop generating the PUSCH or the PSSCH, or may not perform the generation.

Ninth Embodiment

FIG. 15 illustrates a terminal operation for downlink reception or sidelink transmission or reception according to an embodiment of the disclosure.

Referring to FIG. 15, a terminal may perform PDCCH (or PSCCH) monitoring in a determined resource or a configured resource (operation 1510).

The terminal may decode DCI (or SCI transferred from another terminal through a PSCCH) transferred from a base station through a PDCCH, and identify whether it is necessary to identify whether an instant data rate condition is satisfied. If it is necessary to identify whether the instant data rate condition is satisfied, the terminal may identify whether a PDSCH or a PSSCH scheduled by the corresponding DCI (or SCI) satisfies the instant data rate condition described in the above-described embodiments (operation 1520).

If the instant data rate condition is satisfied, the terminal may perform the scheduled PDSCH reception or PSSCH transmission or reception (operation 1530).

If the instant data rate condition is not satisfied, the terminal may perform buffering of the PDSCH or the PSSCH (i.e., may store an information value of the PDSCH or the PSSCH in a buffer), and perform chase coming (CC) or incremental redundancy (IR) combining based on log likelihood ratio (LLR) information corresponding to the PDSCH or the PSS CH stored in a soft buffer, according to a HARQ scheme when the PDSCH or the PSSCH corresponds to retransmission (operation 1540). When energy or SNR of a value of a result of the buffering or combining satisfies a specific condition, the terminal may start a decoding process. Alternatively, after performing the combining as many times as or more than a specific number of times, that is, after receiving data retransmission as many times as or more than a specific number of times, the terminal may start the decoding process.

Tenth Embodiment

FIG. 16 illustrates a terminal operation for downlink reception or sidelink transmission or reception according to an embodiment of the disclosure.

Referring to FIG. 16, a terminal may perform PDCCH (or PSCCH) monitoring in a determined resource or a configured resource (operation 1610).

The terminal may decode DCI (or SCI transferred from another terminal through a PSCCH) transferred from a base station through a PDCCH, and identify whether it is necessary to identify whether an instant data rate condition is satisfied. If it is necessary to identify whether the instant data rate condition is satisfied, the terminal may identify whether a PDSCH or a PSSCH scheduled by the corresponding DCI (or SCI) satisfies the instant data rate condition (operation 1620).

If the instant data rate condition is satisfied, the terminal may perform the scheduled PDSCH reception or PSSCH transmission or reception operation (operation 1630).

If the instant data rate condition is not satisfied, the terminal may perform buffering of the received PDSCH or PSSCH (operation 1641), or may identify whether the PDSCH or PSSCH resource is punctured (operation 1642). For example, the terminal may receive a configuration of one or more radio network temporary identifiers (RNTI) through RRC signaling, wherein a specific RNTI may be utilized to indicate whether a pre-assigned PDSCH or PSSCH resource is punctured. For example, such an RNTI may be an INT-RNTI.

When such an RNTI is configured, the terminal may store, in a soft buffer, only an dLLR value in a data part transferred to an unpunctured resource according a HARQ scheme, and may perform CC combining or IR combining (operation 1643). When energy or SNR of a value of a result of the combining satisfies a specific condition, the terminal may start a decoding process. Alternatively, after performing the combining as many times as or more than a specific number of times, that is, after receiving data retransmission as many times as or more than a specific number of times, the terminal may start the decoding process. In this embodiment, the terminal may not consider (or may discard) a value according to a signal transferred from the punctured resource.

Eleventh Embodiment

FIGS. 17A and 17B illustrate terminal operations for downlink reception or PSSCH transmission or reception according to an embodiment of the disclosure.

Referring to FIG. 17A, a terminal may perform PDCCH (or PSCCH) monitoring in a determined resource or a configured resource (operation 1710). The terminal may perform an operation of receiving a PDSCH or PSSCH scheduled via DCI transferred through a PDCCH, without distinguishment according to the length of the PDSCH or the PSSCH, and/or without identification on whether an instant data rate condition is satisfied (operation 1720). In addition, the terminal may determine a resource (frequency or timing) through which HARQ-ACK information is to be transmitted through the transferred DCI.

The terminal may configure the HARQ-ACK information corresponding to the PDSCH or PSSCH, as NACK, before decoding the PDSCH or the PSSCH (operation 1730).

The terminal may identify whether a HARQ-ACK update timing has reached (operation 1740). The terminal may determine the HARQ-ACK update timing according to the location on the time axis of a HARQ-ACK transmission PUCCH resource. For example, the HARQ-ACK update timing may be a time point preceding by a predetermined time (for example, a PUCCH generation time for HARQ-ACK transmission, which may be determined upon the capability of the terminal) from a start time point of the first symbol of the HARQ-ACK transmission PUCCH resource. The terminal may determine the time point as the HARQ-ACK update timing, and may determine whether the determined HARQ-ACK update timing has reached.

When the HARQ-ACK update timing has reached and the PDSCH or PSSCH decoding is completed, the terminal may update the corresponding HARQ-ACK information, based on a result of the decoding (operation 1705). For example, when the PDSCH or PSSCH decoding is successfully performed, the terminal may update the corresponding HARQ-ACK information as ACK. When the PDSCH or PSSCH decoding is completed before the HARQ-ACK information transmission timing and the HARQ-ACK information is updated, the terminal may transmit the updated information as HARQ-ACK information. When the PDSCH or PSS CH decoding is not completed by the HARQ-ACK transmission timing and the HARQ-ACK information is not updated, the pre-configured HARQ-ACK information (i.e., NACK information) may be transmitted.

Referring to FIG. 17B, when the PDSCH or PSSCH timing is not completed by the HARQ-ACK transmission timing, the terminal may continue the decoding and complete the same even when the HARQ-ACK information transmission time point has passed (operation 1760).

The terminal may identify whether the PDSCH or PSSCH decoding has been successfully performed (operation 1770), and when the decoding is successfully performed, the terminal may not process data retransmitted by a network (or a base station) through the PDSCH or data retransmitted by another terminal through the PSSCH, and may transmit ACK through a newly designated HARQ-ACK information transmission resource (operation 1780). Here, the newly designated HARQ-ACK information transmission resource may be identified based on DCI for scheduling retransmission. When initially transmitted data has failed to successfully decoded, the success/failure of the HARQ-ACK information or decoding may be determined based on data retransmitted by a network (or a base station) through the PDSCH or data retransmitted by another terminal through the PSSCH, or the terminal may continue a decoding process after performing CC combining or IR combining according to a determined HARQ scheme (operation 1790).

In the above-described embodiment, the terminal performs the operation of receiving the PDSCH or the PSSCH scheduled through the DCI transferred through the PDCCH, without identifying whether the instant data rate condition is satisfied, but this embodiment is not limited thereto. That is, the terminal may decode the DCI transferred through the PDCCH to identify whether it is necessary to identify whether the instant data rate condition is satisfied. In addition, if it is necessary to identify whether the instant data rate condition is satisfied, the terminal may determine whether the PUSCH or the PSSCH scheduled by the corresponding DCI satisfies the instant data rate condition.

If the instant data rate condition is satisfied, the terminal may perform an operation of transmitting the scheduled PUSCH or PSSCH. Although not shown in FIGS. 17A and 17B, when the instant data rate condition is not satisfied, the terminal may not perform a preparation operation (for example, preparing data according to the HARQ scheme) for transmitting the scheduled PUSCH or PSSCH.

According to another embodiment, the terminal may perform PDCCH monitoring in a determined resource or a configured resource. The terminal may first perform a preparation operation (for example at least one of data preparation, scrambling, modulation, etc. according to the HARQ scheme) for transmitting the PUSCH or PSSCH scheduled through the DCI transferred from the PDCCH, without distinguishment according to the length of the PUSCH or the PSSCH, and/or without identifying whether the instant data rate condition is satisfied. The terminal may determine, based on the DCI, a resource (frequency or timing) through which the PUSCH or the PSSCH is to be transmitted. Although not shown, when the preparation for transmission of the PUSCH or the PSSCH is completed before the PUSCH transmission timing, the terminal may perform the PUSCH or PSSCH transmission in the scheduled PUSCH or PSSCH, and when the preparation fails to be completed, the terminal may stop the PUSCH or PSSCH transmission preparation operation.

According to an embodiment, the base station may perform an operation for receiving the PUSCH in the resource (frequency or timing) scheduled for the terminal through the DCI transmitted through the PDCCH. The base station may perform an operation for detecting a DMRS in the scheduled resource. If the DMRS is detected, the base station may keep performing an operation for receiving data of the PUSCH, and if the DMRS is not detected, the base station may not perform the operation for receiving the data of the PUSCH.

Twelfth Embodiment

FIG. 18 illustrates an operation of a base station according to an embodiment of the disclosure.

A base station may determine a high layer parameter (a high parameter or an RRC parameter) including at least one of a frequency band to be used, a bandwidth of a carrier to be used in the frequency band, and a subcarrier spacing to be used (operation 1810). In addition, the base station may determine, for each terminal, a high layer parameter related to a terminal initially connected, a newly RRC-configured terminal, a terminal having a high layer parameter change, and a terminal having UE capability exchange.

The base station may calculate a maximum data rate for each terminal by utilizing the determined parameters and Mathematical expression 1. The base station may calculate each maximum data rate according to a communication counterpart of the terminal, that is, according to whether the terminal transmits and receives data with a base station or the terminal transmits and receives data with another terminal (operation 1820).

In addition, the base station may calculate a TBSthreshold value (operation 1830). In this case, TBSthreshold may be calculated based on a specific resource size, for example, at least one of pieces of information related to the specific resource size such as the number of symbols having a specific length and/or the number of slots to which one TB is mapped. In addition, as an example of another parameter for calculating TBSthreshold, the number of symbols included in one slot may be included.

FIG. 19A illustrates an operation of a base station according to an embodiment of the disclosure.

When scheduling for initial transmission or decoding for initial transmission fails, scheduling for retransmission may be needed. In such a case, a base station may determine a terminal which requires such scheduling (operation 1910).

The base station may determine an MCS of the scheduling terminal, based on a channel state (channel state information (CSI) or the like of the determined terminal (operation 1920).

In addition, the base station may identify TBSThreshold determined for each terminal (operation 1930), and may determine a scheduling resource (the number of slots, the number of symbols, the number of RBs, etc.) of the terminal, based on TBSThreshold (operation 1940). Hereinafter, a process in which the base station determines a scheduling resource of the terminal is described in detail with reference to FIG. 19B.

FIG. 19B illustrates an embodiment in which a base station determines a scheduling resource of a terminal according to an embodiment of the disclosure.

FIG. 19B is an embodiment of determining a scheduling resource of a terminal, and referring to FIG. 19B, the base station may determine a minimum scheduling resource (operation 1941). In this case, the minimum scheduling unit resource may be N (N=1, 2, 3, . . . ) RBs.

The base station may apply minimum scheduling unit resource N differently according to a given situation. For example, the minimum scheduling unit resource may be one RB. The base station may add the minimum scheduling unit resource, for example, add RBs one by one, and in this case, may compare whether TBSThreshold of the terminal is satisfied (operation 1943). In another example, the terminal may add slots one by one, and in this case, may compare whether TBSThreshold of the terminal is satisfied.

If TBSThreshold is satisfied (that is, if a TBS calculated based on the scheduled RB is smaller than TBSThreshold and/or if a TBS calculated based on the number of scheduled slots is smaller than TBSThreshold), the base station may additionally assign the minimum scheduling unit resource (operation 1945). If TBSThreshold fails to be satisfied (that is, if the TBS calculated based on the scheduled RB is equal to or greater than TBSThreshold and/or if the TBS calculated based on the number of scheduled slots is equal to or greater than TBSThreshold), the terminal may determine the number of scheduling unit resources (operation 1947).

According to another embodiment of determining a scheduling resource, the base station may pre-calculate a TBS value corresponding to the number of minimum scheduling unit resources and store the same in a table. In such a case, the base station may determine the number of scheduling unit resources satisfying TBSThreshold value, without calculating the same by adding the scheduling unit resource.

The base station may determine whether the determined scheduling resource size is available in the corresponding slot. That is, whether the scheduling resource having the determined size can be included in the corresponding slot(s) may be determined. If the determined scheduling resource size is available in the corresponding slot(s), the base station may finally determine the same as resource assignment for the corresponding terminal, and transmit the DCI or SCI corresponding thereto to the corresponding terminal through the PDCCH. Alternatively, if the determined scheduling resource size is not available in the corresponding slot(s), the base station may finally determine that the resource assignment for the corresponding terminal is not performed in the corresponding slot(s), or may determine to only assign as many resources as the number of available resources to the corresponding terminal (or change the determined scheduling resource size), and may transmit the DCI or SCI corresponding thereto to the corresponding terminal through the PDCCH.

In the embodiments above, examples for the PDSCH transmission are described, but may also be applied to PUSCH transmission or PSSCH transmission. In this case, the downlink transmission-related base station configuration information and terminal capability information, used in the embodiments above, may be changed to uplink transmission-related base station configuration information and terminal capability information, and applied.

Transmitters, Receivers, and processors of a terminal and a base station for performing embodiments of the disclosure are illustrated in FIGS. 20 and 21, respectively. To calculate an actual data rate and perform a transmission or reception method according to at least one of various embodiments, the receiver, the processor, and the transmitter of each of the base station and the terminal may operate according to the above-described embodiment.

FIG. 20 is a block diagram illustrating a terminal according to an embodiment of the disclosure.

As shown in FIG. 20, a terminal of the disclosure may include a receiver 20-00, a terminal transmitter 20-04, and a processor 20-02. The receiver 20-00 and the transmitter 20-04 may be collectively called a transceiver in the disclosure. The transceiver may transmit or receive a signal with a base station or another terminal Here, the signal may include control information and data. To this end, the transceiver may include an RF transmitter for up-converting and amplifying a frequency of a transmitted signal, an RF receiver for low-noise amplifying a received signal and down-converting a frequency, etc.

In addition, the transceiver may receive a signal through a wireless channel to output the signal to the processor 20-02, and transmit a signal output from the processor 20-02 through the wireless channel. The processor 20-02 may control a series of processes so that the terminal can operate according to an embodiment of the disclosure. For example, the receiver 20-00 may receive, from a base station or another terminal, control information and data including scheduling information for data transmission, and the processor 20-02 may compare a peak data rate of the terminal with a scheduled data amount to determine whether to perform decoding and transmission, and accordingly, perform signal processing according to the determination. Thereafter, signals which need to be transmitted from the transmitter 20-04 may be transferred to the base station or another terminal.

FIG. 21 is a block diagram illustrating a base station according to an embodiment of the disclosure.

As shown in FIG. 21, a base station of the disclosure may include a receiver 21-01, a transmitter 21-05, and a processor 21-03. The base station receiver 21-01 and the transmitter 21-05 may be collectively called a transceiver of the disclosure. The transceiver may transmit or receive a signal to or from a terminal. Here, the signal may include control information and data. To this end, the transmitter may include an RF transmitter for up-converting and amplifying a frequency of a transmitted signal, an RF receiver for low-noise amplifying a received signal and down-converting a frequency, etc. In addition, the transceiver may receive a signal through a wireless channel to output the signal to the processor 21-03, and may transmit a signal output from the processor 21-03 through the wireless channel.

The processor 21-03 may control a series of processes so that the base station can perform according to the above-described embodiment of the disclosure. For example, the processor 21-03 may calculate a peak data rate of the terminal according to a communication counterpart of the terminal, and may determine a TBS in the range not exceeding the peak data rate to perform scheduling and generate the control information.

Thereafter, the transmitter 21-05 may transmit the generated control information, and the receiver 21-01 may receive feedback or an uplink data signal of the terminal.

According to an embodiment of the disclosure, a method of a terminal in a wireless communication system is provided. The method includes monitoring a physical downlink control channel (PDCCH), identifying whether a scheduling limitation condition is determined, based on decoded downlink control information (DCI) as a result of the monitoring, identifying whether a physical downlink shared channel (PDSCH) scheduled through the DCI satisfies the scheduling limitation condition when determination on the scheduling limitation condition is needed, and receiving data from a base station through the PDSCH when the scheduling limitation condition is satisfied.

According to an embodiment of the disclosure, a terminal of a wireless communication system is provided. The terminal may include a transceiver, and a controller for monitoring a PDCCH, identifying whether a scheduling limitation condition is determined, based on decoded DCI as a result of the monitoring, identifying whether a PDSCH scheduled through the DCI satisfies the scheduling limitation condition when determination on the scheduling limitation condition is needed, and receiving data from a base station through the PDSCH when the scheduling limitation condition is satisfied.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in the methods of the disclosure, a part or all of the contents of each embodiment may be combined without departing from the essential spirit and scope of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, embodiments 1 and 2 may be employed in combination, or a part of embodiment 1 and a part of embodiment 2 may be employed in combination. Moreover, other variants of the above embodiments, based on the technical idea of the embodiments, may be implemented in LTE and 5G systems.

The invention claimed is:

1. A method performed by a terminal in a communication system, the method comprising:

identifying a maximum data rate supported by the terminal, the maximum data rate comprising a first maximum data rate for all configured serving cells;

identifying a number of slots corresponding to one transport block (TB);

based on the number of slots corresponding to the one TB, identifying an instant data rate comprising a first instant data rate for the all configured serving cells;

identifying whether a first condition that the first maximum data rate is greater than or equal to the first instant data rate is satisfied; and based on whether the first condition is satisfied, transmitting or receiving data, wherein in case that the number of slots is one, the first instant data rate is determined as $$\sum_{j=0}^{J-1} \frac{\sum_{m=0}^{M-1} V_{j,m}}{T_{slot}^{\mu(j)}},$$

wherein in case that the number of slots is two or more, the first instant data rate is determined as $$\sum_{j=0}^{J-1} \frac{\sum_{m=0}^{M-1} V_{j,m}}{L X T_s^{\mu}},$$

wherein J is a number of the all configured serving cells, wherein j is a serving cell index, wherein M is a number of TBs transmitted in slot $s_j$, wherein m is a TB index, wherein L is a number of allocated symbols, wherein $$V_{j,m} = C' \cdot \left\lfloor \frac{A}{C} \right\rfloor,$$

wherein A is a number of bits in the TB, wherein C is a total number of code blocks for the TB, wherein C' is a number of code blocks scheduled for the TB, wherein $$T_{slot}^{\mu(j)} = \frac{10^{-3}}{2^{\mu(j)}},$$

and $\mu(j)$ is numerology for the slot $s_j$, and wherein $$T_s^{\mu} = \frac{10^{-3}}{2^{\mu} \cdot N_{symb}^{slot}},$$

$\mu$ is numerology, and $N_{symb}^{slot}$ is a number of symbols for each slot.

2. The method of claim 1, wherein the maximum data rate further comprises a second maximum data rate for one serving cell, and the instant data further comprises a second instant data rate for the one serving cell, wherein the method further comprises:

identifying whether a second condition that the second maximum data rate is greater than or equal to the second instant data rate is satisfied; and based on whether the second condition is satisfied, transmitting or receiving data, wherein in case that the number of slots is one, the second instant data rate is determined as $$\frac{\sum_m^{M-1} V_{j,m}}{L \times T_s^{\mu}},$$

wherein $$fn\left(LXT_s^{\mu}, T_{slot}^{\mu(j)}\right)$$

is one of $$\max\left(LXT_s^{\mu}, T_{slot}^{\mu(j)}\right)$$

and $$\min\left(LXT_s^{\mu}, T_{slot}^{\mu(j)}\right).$$

3. A terminal in a communication system, the terminal comprising:

a transceiver; and a controller configured to:

identify a maximum data rate supported by the terminal, the maximum data rate comprising a first maximum data rate for all configured serving cells, identify a number of slots corresponding to one transport block (TB), based on the number of slots corresponding to the one TB, identify an instant data rate comprising a first instant data rate for the all configured serving cells, identify whether a first condition that the first maximum data rate is greater than or equal to the first instant data rate is satisfied, and based on whether the first condition is satisfied, transmit or receive data, wherein in case that the number of slots is one, the first instant data rate is determined as $$\sum_{j=0}^{J-1} \frac{\sum_{m=0}^{M-1} V_{j,m}}{T_{slot}^{\mu(j)}},$$

wherein in case that the number of slots is two or more, the first instant data rate is determined as $$\sum_{j=0}^{J-1} \frac{\sum_{m=0}^{M-1} V_{j,m}}{L \times T_s^{\mu}},$$

wherein J is a number of the all configured serving cells, wherein j is a serving cell index, wherein M is a number of TBs transmitted in slot $s_j$, wherein m is a TB index,
wherein L is a number of allocated symbols,
wherein $$V_{j,m} = C' \cdot \left\lceil \frac{A}{C} \right\rceil,$$

wherein A is a number of bits in the TB,
wherein C is a total number of code blocks for the TB,
wherein C' is a number of code blocks scheduled for the TB,
wherein $$T_{slot}^{\mu(j)} = \frac{10^{-3}}{2^{\mu(j)}},$$

and $\mu(j)$ is numerology for the slot $s_j$, and
wherein $$T_s^{\mu} = \frac{10^{-3}}{2^{\mu} \cdot N_{symb}^{slot}},$$

$\mu$ is numerology, and $N_{symb}^{slot}$ is a number of symbols for each slot.

4. The terminal of claim 3, wherein the maximum data rate further comprises a second maximum data rate for one serving cell, and the instant data further comprises a second instant data rate for the one serving cell, wherein the controller is further configured to:

identify whether a second condition that the second maximum data rate is greater than or equal to the second instant data rate is satisfied, and based on whether the second condition is satisfied, transmit or receive data wherein in case that the number of slots is one, the second instant data rate is determined as $$\frac{\sum_m^{M-1} V_{j,m}}{L \times T_s^{\mu}},$$

wherein in case that the number of slots is two or more, the second instant data rate is determined as $$\frac{\sum_m^{M-1} V_{j,m}}{fn\left(L \times T_s^{\mu}, T_{slot}^{\mu(j)}\right)},$$

wherein $$fn\left(LXT_s^{\mu}, T_{slot}^{\mu(j)}\right)$$

is one of $$\max\left(LXT_s^{\mu}, T_{slot}^{\mu(j)}\right)$$

and $$\min\left(LXT_s^{\mu}, T_{slot}^{\mu(j)}\right).$$

5

\* \* \* \* \*